US012779466B2

(12) United States Patent
Dobson et al.

(10) Patent No.: US 12,779,466 B2
(45) Date of Patent: Nov. 3, 2026

(54) MICROFLUIDIC SEALING VALVE AND MICROFLUIDIC CIRCUIT

(71) Applicant: UNIVERSITY OF CANTERBURY, Christchurch (NZ)

(72) Inventors: Renwick Charles Joseph Dobson, Christchurch (NZ); Fabian Xeno Ole Dolamore, Christchurch (NZ); Julian Menges, Ruppertsberg (DE); Volker Michael Nock, Christchurch (NZ); Robert Claude Meffan, Osaka (JP)

(73) Assignee: UNIVERSITY OF CANTERBURY, Christchurch (NZ)

( * ) Notice: Subject to any disclaimer, the term of this patent is extended or adjusted under 35 U.S.C. 154(b) by 1041 days.

(21) Appl. No.: 17/798,409

(22) PCT Filed: Feb. 12, 2021

(86) PCT No.: PCT/IB2021/051153
§ 371 (c)(1),
(2) Date: Aug. 9, 2022

(87) PCT Pub. No.: WO2021/161229
PCT Pub. Date: Aug. 19, 2021

(65) Prior Publication Data

US 2023/0083434 A1 Mar. 16, 2023

Related U.S. Application Data

(60) Provisional application No. 62/975,511, filed on Feb. 12, 2020.

(51) Int. Cl.
*F15C 1/04* (2006.01)
*B01L 3/00* (2006.01)
*F16K 99/00* (2006.01)

(52) U.S. Cl.
CPC ... *B01L 3/502738* (2013.01); *B01L 3/502746* (2013.01); *B01L 2200/0605* (2013.01);
(Continued)

(58) Field of Classification Search
None
See application file for complete search history.

(56) References Cited

U.S. PATENT DOCUMENTS 6,591,852 B1 * 7/2003 McNeely .............. B01F 25/432
137/841
7,134,453 B2 11/2006 Peters et al.
(Continued)

FOREIGN PATENT DOCUMENTS

WO 2012/003711 1/2012
WO 2015/019336 2/2015

OTHER PUBLICATIONS

International Search Report and Written Opinion corresponding to International Patent Application No. PCT/ B2021/051153, mailed Mar. 5, 2021.

*Primary Examiner* — Maris R Kessel
*Assistant Examiner* — Madison T. Herbert
(74) *Attorney, Agent, or Firm* — Lathrop GPM LLP; Malaika O.D. Tyson

(57) ABSTRACT

A microfluidic sealing valve 1 comprises a primary channel 2, a valve channel 4, and a geometry that permits liquid in the primary channel 2 to flow into the valve channel 4 through an inlet 5. Liquid in the primary channel 2 is inhibited from flowing through a first port 8 into the void volume 7. A meniscus 9 moved by a flow of liquid in the primary channel 2 is restrained at the first port 8. A flow of liquid through the primary channel 2 generates a capillary force that causes the flow of liquid to flow into the valve channel 4. A capillary force generated by the flow of liquid through the valve channel 4 causes the meniscus 9 to expand
(Continued)

from the first port 8 into the primary channel, to inhibit flow of liquid in the primary channel 2 past the first port 8.

19 Claims, 21 Drawing Sheets

(52) U.S. Cl.
CPC .................. *B01L 2200/0621* (2013.01); *B01L 2300/0816* (2013.01); *B01L 2400/0406* (2013.01); *B01L 2400/0688* (2013.01); *B01L 2400/084* (2013.01); *F16K 99/0019* (2013.01)

(56) References Cited

U.S. PATENT DOCUMENTS

| | | | | |
|---|---|---|---|---|
| 8,388,908 | B2 | 3/2013 | Blaga et al. | |
| 10,518,262 | B2 | 12/2019 | Sprague et al. | |
| 2004/0206408 | A1* | 10/2004 | Peters | F16K 99/0028 137/825 |
| 2005/0118070 | A1* | 6/2005 | Griss | F16K 99/0017 422/400 |
| 2013/0206250 | A1* | 8/2013 | Zhang | F16K 99/0044 137/237 |
| 2016/0214108 | A1* | 7/2016 | Solomon | B01L 3/502715 |
| 2016/0303564 | A1* | 10/2016 | Gilbert | B01L 3/502746 |
| 2016/0339430 | A1* | 11/2016 | White | B01L 3/502715 |

* cited by examiner

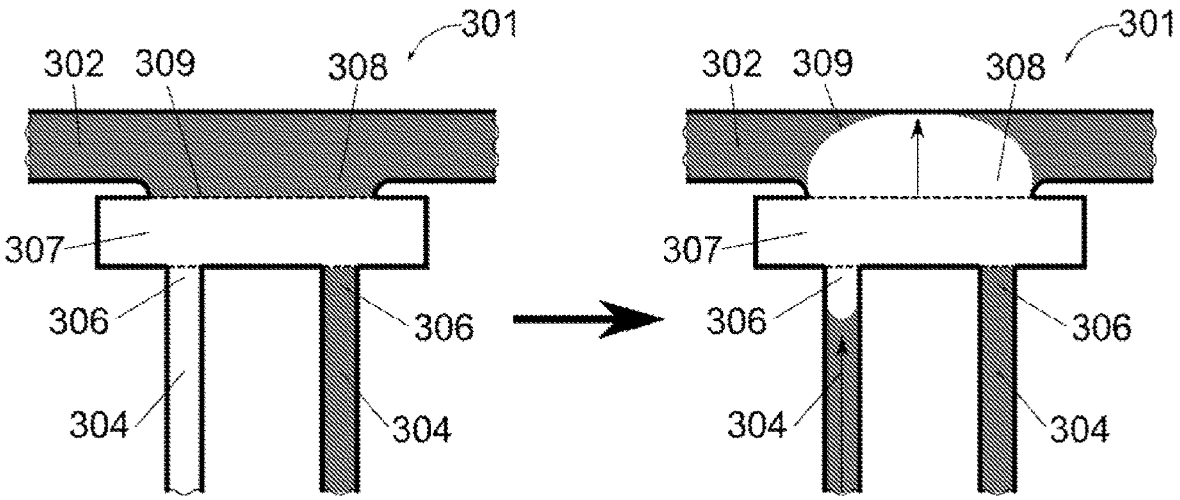
Fig 3A
Fig 3B
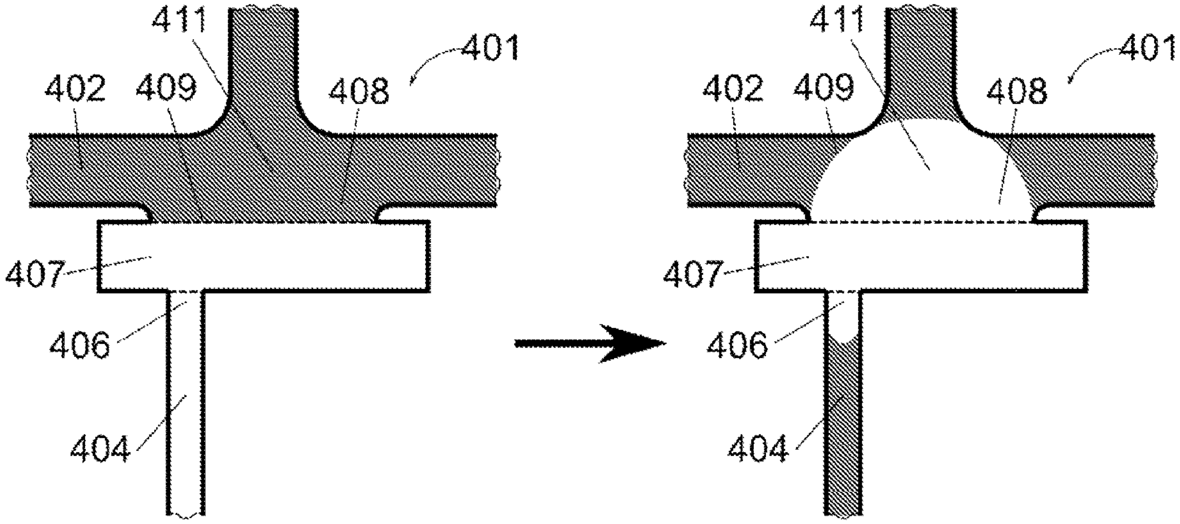
Fig 4A
Fig 4B

MICROFLUIDIC SEALING VALVE AND MICROFLUIDIC CIRCUIT

RELATED APPLICATIONS

The present application is filed pursuant to 35 U.S.C. 371 as a U.S. National Phase application of International Patent Application No. PCT/IB2021/051153, which was filed Feb. 12, 2021, claiming the benefit of U.S. Provisional Application No. 62/975,511, filed Feb. 12, 2020. The entire text of the aforementioned applications is incorporated herein by reference in its entirety.

FIELD OF THE INVENTION

This invention relates to microfluidic circuits and components for use therein.

BACKGROUND

Microfluidic devices are miniaturised liquid handling systems typically embedded in small chips. Their size makes them suitable for use in biological, chemical and clinical applications due to their low volume demands, low cost and disposability. However, they often require peripheral equipment such as electromechanical pumps, valves, actuators and the like in order to provide appropriate functionality in a laboratory setting. The complexity of these peripheral elements limit the potential use of microfluidic devices in both traditional biological or chemical 'lab-on-a-chip' (LOAC) settings as well as clinical 'point-of-care' (POC) settings in which diagnostic testing is desirably conducted at the time and place of patient care.

Capillarics is an emerging field within microfluidics in which capillary systems are connected to circuit-like structures to enable and/or improve functionality of a microfluidic circuit. Such systems are driven purely by capillary pressure, utilising surface tension effects that are determined by surface geometry and surface chemistry to automate or pre-set flow control within a microfluidic chip. As such they do not require peripheral elements to enable autonomous sampling and laboratory operations like mixing and analysis on chips.

For example, sandwich immunoassays have been reported in the past that use capillarics to distribute chemicals to sensitive areas on a chip. The Biosite Incorporated Triage® Chip is one such commercial system that uses capillarics for a fluorescence immunoassay for the quantitative determination of the cardiac proteins creatine-kinase-MB (CK-MB), myoglobin, and troponin I (cTnI); biomarkers for myocardial infarction and other acute coronary syndromes in whole blood and plasma.

Important to the success of these systems is the control over liquid flow, commonly enabled by sequential filling of the capillary channels. To enable autonomous on-chip control over liquid flow, several basic capillary driven operation units have been developed that provide the functionality of the more complex peripheral elements in traditional microfluidic devices. These operation units include inlets, reservoirs, vents, pumps, resistors, reaction pads, and passive trigger valves. The latter fulfil a role in enabling the construction of retention burst valves that allow for autonomous sequential filling.

Systems incorporating these capillary operation units have so far only allowed for linear or tree-like setups with input channels, reaction units and output units/capillary pumps arranged in a sequential manner. These conventional capillary systems lack feedback loops that change conditions further upstream in the circuit depending on changing conditions at a point further downstream in the circuit. Furthermore, mixing of components on these systems has proven difficult, as it usually involves using components with a high flow resistance. In particular, the uptake of solid chemicals can be difficult as it requires a certain dwelling time in order to achieve complete dissolution.

This demonstrates that there is a need in the art for capillary operation units which enable timed retention of the liquid providing reactive feedbacks loops that thus increase the applicability of capillarics within microfluidic devices. Operation units are described herein that include a microfluidic sealing valve which, once triggered by flow through a channel, allows for inhibiting of flow through another or the same channel and a transistor valve which can act as an on/off gate to control mixing of liquid flows through different channels. Also described herein are arrangements of capillaric microfluidic circuits comprising said microfluidic sealing valve and said transistor valve.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide a microfluidic sealing valve or a microfluidic circuit that overcomes the drawbacks of conventional systems described above and/or that at least provides the public with a useful choice.

SUMMARY OF THE INVENTION

According to a first aspect of the invention, there is provided a microfluidic sealing valve comprising a primary channel and optionally a secondary channel; at least one valve channel having an inlet and an outlet, the at least one valve channel in fluid communication with the primary channel or the secondary channel, the inlet of the at least one valve channel providing a connection between the at least one valve channel and the primary channel or the secondary channel, and the connection between the inlet of the at least one valve channel and the primary channel or the secondary channel having a geometry that permits liquid in the primary channel or the secondary channel to flow into the at least one valve channel through the inlet; a void volume having a first port connecting the void volume to the primary channel, the first port having a geometry that inhibits liquid in the primary channel from flowing through the first port into the void volume such that a meniscus moved by a flow of liquid in the primary channel is restrained at the first port and the outlet of the at least one valve channel providing a connection between the at least one valve channel and the void volume; wherein a flow of liquid through the primary channel or the secondary channel generates a capillary force that causes the flow of liquid to flow through the inlet into the at least one valve channel, the cross-sectional area of the first port being substantially larger than a cross-sectional area of the at least one valve channel such that a capillary force generated by the flow of liquid through the at least one valve channel causes the meniscus restrained at the first port to expand from the first port into the primary channel, to inhibit flow of liquid in the primary channel past the first port.

In an embodiment, the geometry of the outlet of the at least one valve channel is configured to inhibit liquid in the at least one valve channel from flowing into the void volume.

In an embodiment, the cross-sectional area of the outlet of the at least one valve channel is equal to the cross-sectional area of the at least one valve channel.

In an embodiment, an inner peripheral wall of the void volume located at or adjacent the first port is angled at about 180 degrees or more relative to an imaginary plane extending across the first port.

In an embodiment, an inner peripheral wall of the void volume located at or adjacent the outlet of the at least one valve channel is angled at about 180 degrees or more relative to an imaginary plane extending across the outlet.

In an embodiment, the microfluidic sealing valve according to the first aspect of the invention further comprises two or more of the valve channels.

In an embodiment, the outlets of the two or more valve channels provide a connection between the two or more valve channels and the void volume.

In an embodiment, the meniscus restrained at the first port expands from the first port into the primary channel to inhibit flow of liquid in the primary channel past the first port only upon generation of a sufficient capillary force caused when a flow of liquid is incoming in both or all of the two or more valve channels, or when a flow of liquid is incoming in one of the two or more valve channels while the other of the two or more valve channels already has liquid present therein.

In an embodiment, the microfluidic sealing valve according to the first aspect of the invention comprises a single valve channel.

In an embodiment, an intersection of channels is located at the primary channel at or adjacent the void volume so that the expansion of the meniscus restrained at the first port into the primary channel inhibits flow of liquid in the primary channel and/or in the intersection of channels past the first port.

In an embodiment, the inlet of the at least one valve channel provides the connection between the at least one valve channel and the primary channel and is in fluid communication with the primary channel.

In an embodiment, the inlet of the at least one valve channel provides the connection between the at least one valve channel and the secondary channel and is in fluid communication with the secondary channel.

In an embodiment, a length of the at least one valve channel determines the extent to which the meniscus restrained at the first port expands from the first port into the primary channel upon generation of the capillary force by the flow of liquid through the at least one valve channel.

According to a second aspect of the invention, a microfluidic circuit is provided comprising a main channel, a trigger channel and a transistor valve. The transistor valve comprising a first plurality of microchannels extending between and fluidly connecting the trigger channel to the main channel, wherein a geometry of the first plurality of microchannels between the trigger channel and the main channel is configured such that liquid in the main channel is inhibited from flowing into the trigger channel through the first plurality of microchannels unless liquid is present in the trigger channel at or adjacent the first plurality of microchannels, and such that when liquid is present in the trigger channel at or adjacent the first plurality of microchannels, fluid communication is permitted between the liquid in the main channel and the liquid in the trigger channel through the first plurality of microchannels to permit the liquids to mix; the microfluidic circuit further comprising the microfluidic sealing valve as outlined in relation to the first aspect provided at the trigger channel.

In an embodiment, a depth of the first plurality of microchannels is up to about 75% of a depth of the main channel.

In an embodiment, a geometry of the first plurality of microchannels between the trigger channel and the main channel is configured such that liquid in the trigger channel is inhibited from flowing into the main channel through the first plurality of microchannels unless liquid is present in the main channel at or adjacent the first plurality of microchannels.

In an embodiment, the transistor valve further comprises a second plurality of microchannels extending between and fluidly connecting the trigger channel to a supply channel, wherein a geometry of the second plurality of microchannels between the trigger channel and the supply channel is configured such that liquid in the supply channel is inhibited from flowing into the trigger channel through the second plurality of microchannels unless liquid is present in the trigger channel at or adjacent the second plurality of microchannels, and such that liquid in the trigger channel is inhibited from flowing into the supply channel through the second plurality of microchannels unless liquid is present in the supply channel at or adjacent the second plurality of microchannels, and such that when liquid is present in the trigger channel at or adjacent the first plurality of microchannels and the second plurality of microchannels, fluid communication is permitted between the liquid in the main channel, the liquid in the trigger channel and the liquid in the supply channel through the first and second plurality of microchannels to permit the liquids to mix.

In an embodiment, the first plurality of microchannels and the second plurality of microchannels have a depth that is shallower than a depth of the trigger channel, the main channel, and/or the supply channel.

In an embodiment, the depth of the second plurality of microchannels is up to about 75% of the depth of the supply channel.

In an embodiment, an imaginary plane extending across the first plurality of microchannels is angled at about 180 degrees or more relative to an inner peripheral wall of the trigger channel located at or adjacent the first plurality of microchannels.

In an embodiment, an imaginary plane extending across the second plurality of microchannels is angled at about 180 degrees or more relative to the inner peripheral wall of the trigger channel located at or adjacent the second plurality of microchannels.

In an embodiment, the primary channel of the microfluidic sealing valve forms part of and is in fluid communication with the trigger channel of the microfluidic circuit, such that expansion of the meniscus at the first port into the primary channel inhibits flow of liquid in the trigger channel past the first port.

In an embodiment, the inlet of the at least one valve channel is provided at the trigger channel proximate to the microfluidic sealing valve, and wherein the microfluidic circuit is arranged such that flow of liquid through the trigger channel will pass through the microfluidic sealing valve provided at the trigger channel, the at least one valve channel of the microfluidic sealing valve arranged to allow the flow of liquid through the trigger channel to progress to the transistor valve before the microfluidic sealing valve inhibits the flow of liquid through the trigger channel.

In an embodiment, the microfluidic sealing valve is provided with a layer of hydrophobic material.

In an embodiment, at least the microfluidic sealing valve and the microfluidic circuit are provided with a layer of hydrophobic material.

Depending on the on-chip system requirements, the microfluidic circuits may be configured with two basic setups. Firstly, they can be used to retain liquid for purposes of chemical uptake or synchronizing of liquid flow through different channels. Secondly, they can be used to form a bridge between pre-filled channels, enabling sequential filling or reduction of flow resistance in long capillaric systems. Additionally, the valve channels of the microfluidic sealing valve can also be designed to time the trigger event by introducing flow resistors. These microfluidic circuits that implement the microfluidic sealing valve as well as the transistor valve are unique in their simplicity and capability of allowing improved trigger timing and an overall reduction of flow resistance, thus providing improved and novel functionalities to capillaric microfluidic devices.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both. The invention consists in the foregoing and also envisages constructions of which the following gives examples only.

BRIEF DESCRIPTION OF THE DRAWINGS

The present invention will now be described by way of example only and with reference to the accompanying drawings in which:

FIG. 3A shows a schematic view an embodiment of a microfluidic sealing valve with two valve channels.

FIG. 3B shows a schematic view of the microfluidic sealing valve of FIG. 3A with liquid flow through a primary channel being inhibited.

FIG. 4A shows a schematic view of an embodiment of a microfluidic sealing valve provided at an intersection of channels.

FIG. 4B shows a schematic view of the microfluidic sealing valve of FIG. 4A with liquid flow through the intersection of channels being inhibited.

DETAILED DESCRIPTION OF EMBODIMENTS

Figure 1A:
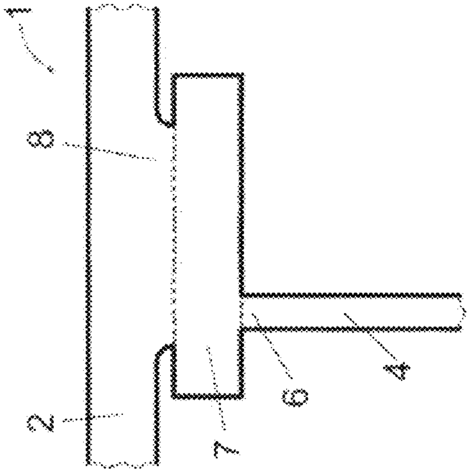
FIG. 1A shows a schematic view of an embodiment of a microfluidic sealing valve.

Embodiments of a microfluidic sealing valve are now described which, once triggered by flow through a channel, allow for inhibiting of flow through another or the same channel. These microfluidic sealing valves can be embedded in capillaric circuits in microfluidic devices to provide various functions.

Microfluidic circuits and components will typically have channels with dimensions ranging from tens to hundreds of micrometers.

An embodiment of a microfluidic sealing valve 1, as shown in FIGS. 1A-1F, 2A and 2B comprises a primary channel 2 and at least one valve channel 4 having an inlet 5 (shown in FIG. 2A) and an outlet 6. The at least one valve channel 4 allows for fluid communication between the at least one valve channel 4 and the primary channel 2, via the inlet 5 of the at least one valve channel 4 that provides a connection therebetween.

The inlet 5 of the at least one valve channel 4 provides a connection between the at least one valve channel 4 and the primary channel 2. Further, the outlet 6 of the at least one valve channel 4 provides a connection between the at least one valve channel 4 and the primary channel 2 through a void volume 7. The void volume 7 therefore facilitates that connection between the at least one valve channel 4 and the primary channel 2 via a first port 8 that connects the void volume 7 to the primary channel 2.

Figure 2A:
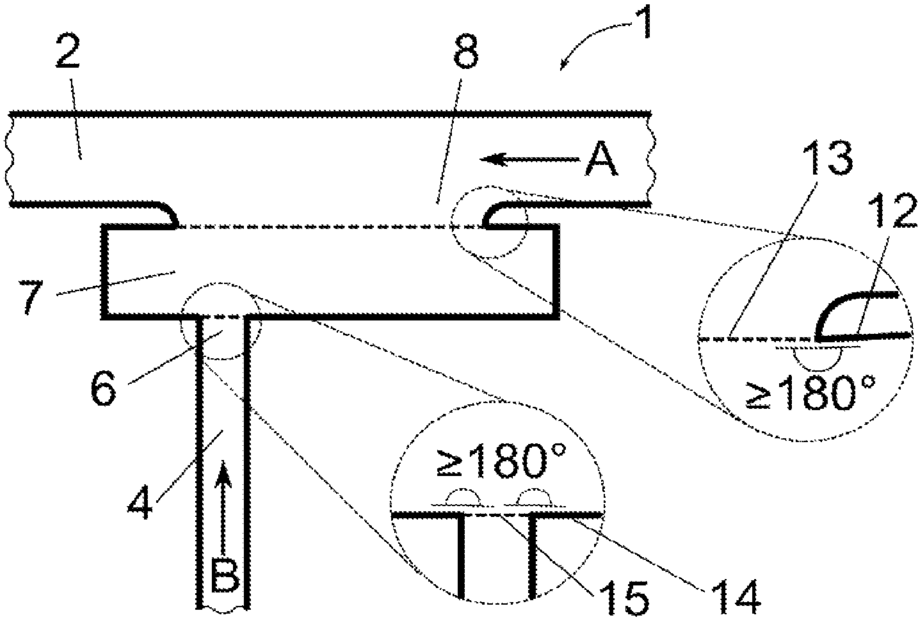
FIG. 2A shows a schematic view of an embodiment of a void volume of the microfluidic sealing valve of FIG. 1A.

The first port 8 has a geometry that inhibits liquid present in the primary channel 2 from flowing through the first port 8 into the void volume 7. More specifically, as can be seen in FIG. 2A, an inner peripheral wall 12 of the void volume 7 located at or adjacent the first port 8 is angled at about 180 degrees or more relative to an imaginary plane 13 extending across the first port 8.

This angle constraint ensures that a meniscus 9 moved by a flow of liquid passing through the primary channel 2, in the direction A, 'pins' at the imaginary plane 13 due to surface tension effects, whereas an angle less than 180 degrees may allow the capillary forces driving the liquid flow to overcome surface tension effects, causing the meniscus 9, and therefore the liquid to pass through the first port 8 into the void volume 7.

Likewise, the geometry of the outlet 6 of the at least one valve channel 4 is configured to inhibit liquid in the at least one valve channel 4 from passing into the void volume 7. More specifically, an inner peripheral wall 14 of the void volume 7 located at or adjacent the outlet 6 of the at least one valve channel 4 is angled at about 180 degrees or more relative to an imaginary plane 15 extending across the outlet 6, as can be seen in FIG. 2A.

This angle constraint ensures that a meniscus moved by a flow of liquid passing through the at least one valve channel 4, in the direction B, 'pins' at the imaginary plane 15 due to surface tension effects, whereas an angle less than 180 degrees may allow the capillary forces driving the liquid flow to overcome surface tension effects, causing the meniscus, and therefore the liquid, to pass through the outlet 6 into the void volume 7.

Figure 1B:
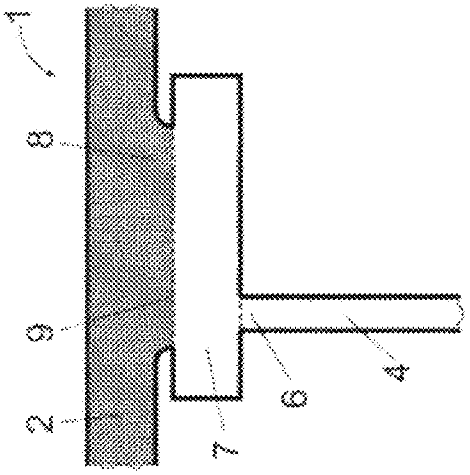
FIG. 1B shows a schematic view of the microfluidic sealing valve of FIG. 1A with liquid flow through a primary channel.
Figure 1C:
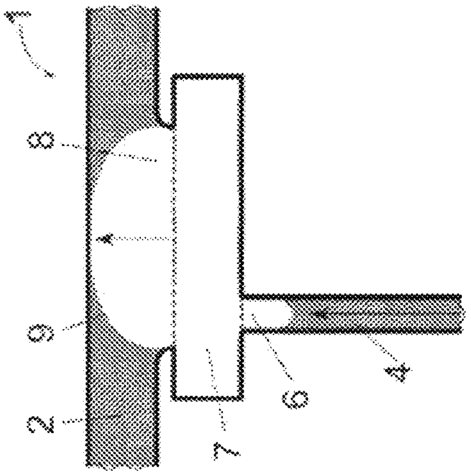
FIG. 1C shows a schematic view of the microfluidic sealing valve of FIG. 1A with liquid flow through a primary channel being inhibited.
Figure 1D:
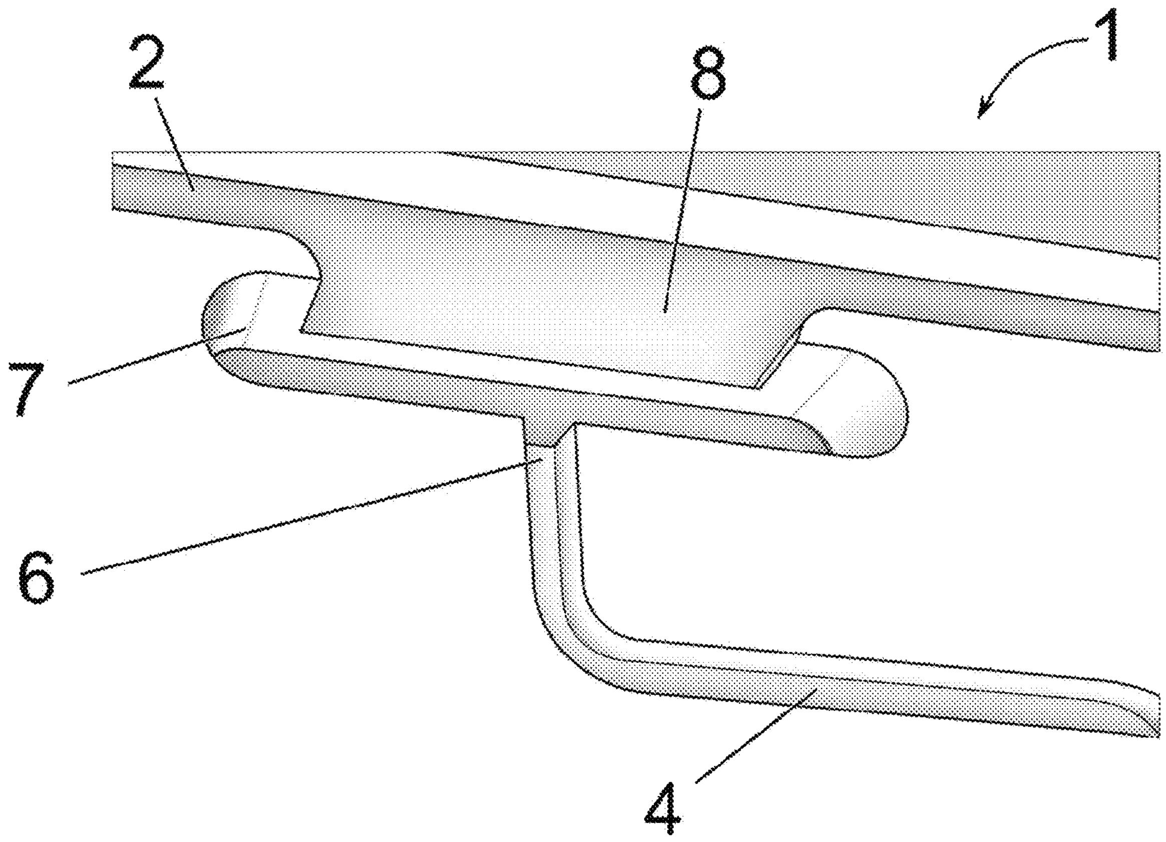
FIG. 1D shows an isometric view of the microfluidic sealing valve of FIG. 1A.
Figure 1E:
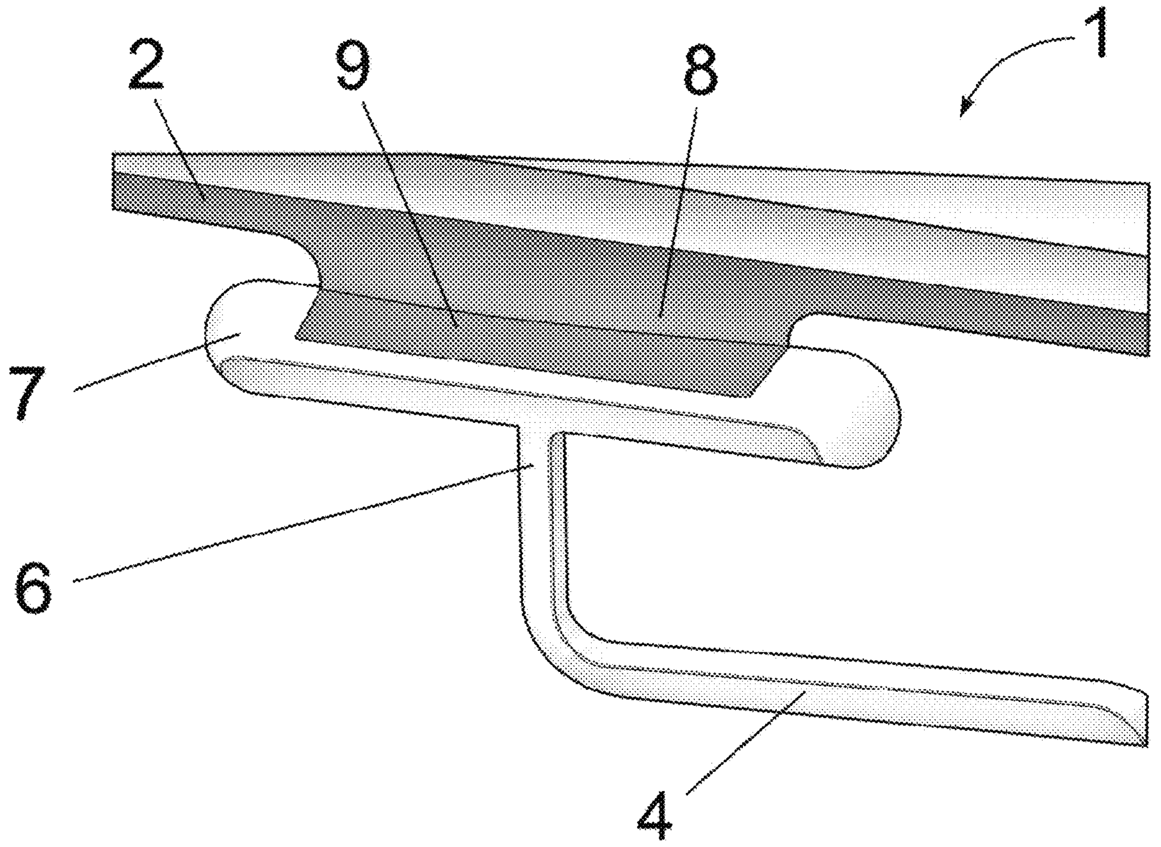
FIG. 1E shows an isometric view of the microfluidic sealing valve of FIG. 1A with liquid flow through a primary channel.

By contrast, the connection between the inlet 5 of the at least one valve channel 4 and the primary channel 2 has a geometry that permits liquid in the primary channel 2 to flow into the at least one valve channel 4 through the inlet 5, thereby allowing for fluid communication between the at least one valve channel 4 and the primary channel 2 through the inlet 5. Therefore, the configuration of the outlet 6 into the void volume 7, as well as the configuration of the first port 8 out of the void volume 7, prevent any liquid from flowing into the void volume 7, whether that liquid is present in the primary channel 2 or the at least one valve channel 4. Thus, a meniscus 9 moved by a flow of liquid in the primary channel 2 will 'pin', or be restrained, at the first port 8, while the flow of liquid continues downstream through the primary channel 2, as shown in FIGS. 1B and 1E.

Figure 1F:
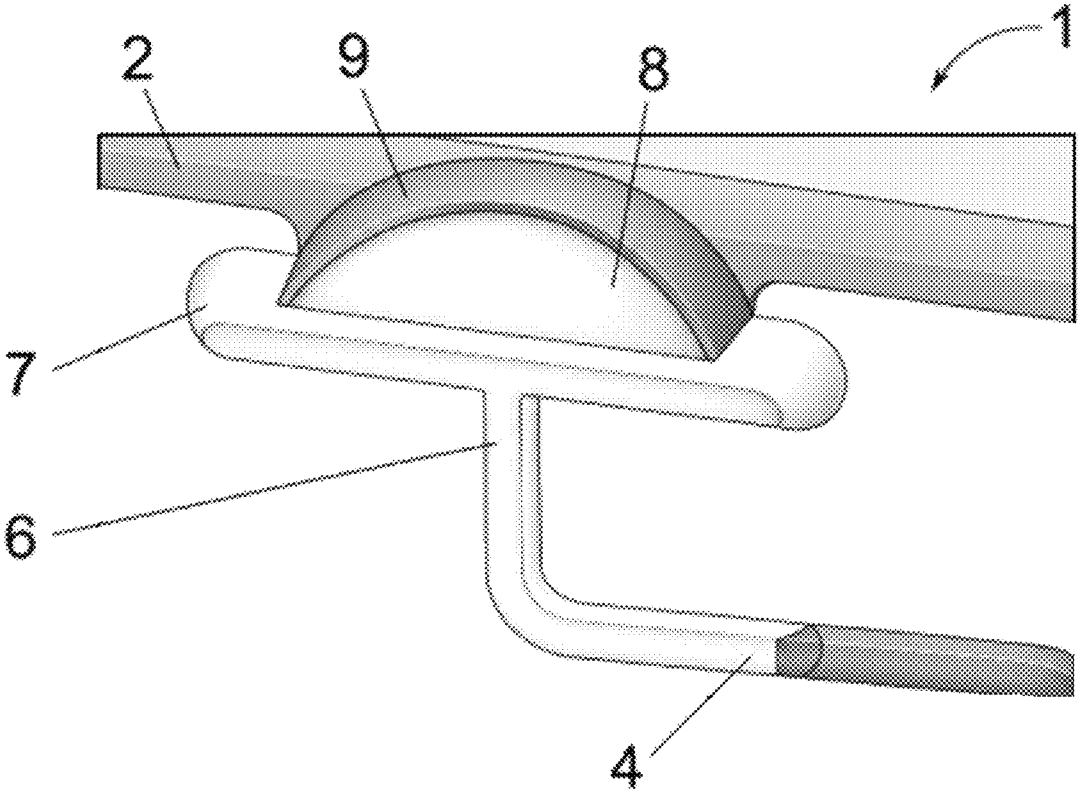
FIG. 1F shows an isometric view of the microfluidic sealing valve of FIG. 1A with liquid flow through a primary channel being inhibited.
Figure 2B:
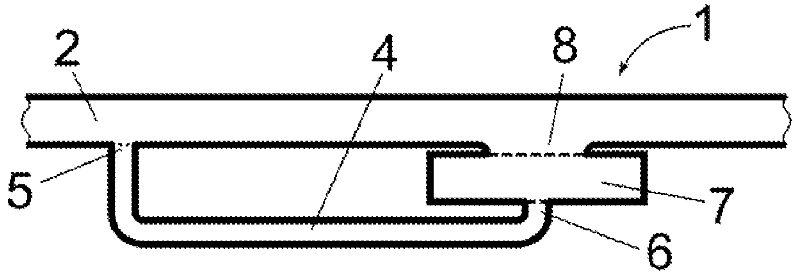
FIG. 2B shows a schematic view of the microfluidic sealing valve of FIG. 1A with its inlet provided at a primary channel.
Figure 2C:
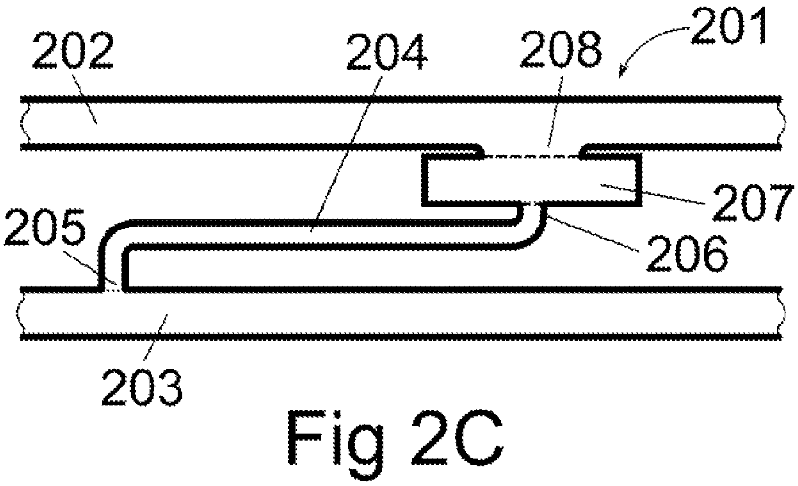
FIG. 2C shows a schematic view of an embodiment of a microfluidic sealing valve with its inlet provided at a secondary channel.

FIG. 2C shows an embodiment microfluidic sealing valve 201, in which the at least one valve channel 204 allows for fluid communication between the at least one valve channel 204 and a secondary channel 203, via the inlet 205 of the at least one valve channel 204 that provides a connection between the at least one valve channel 204 and the secondary channel 203. This embodiment operates under substantially the same working principles as the microfluidic sealing valve 1 of FIGS. 1A-1F, 2A and 2B where like parts are indicated by the same numerals as FIGS. 1A-1F, 2A and 2B with the addition of 200. Therefore, the described configuration of the microfluidic sealing valve 1 also applies to the microfluidic sealing valve 201.

Therefore, like the microfluidic sealing valve 1, the connection between the inlet 205 of the at least one valve channel 204 and the secondary channel 203 has a geometry that permits liquid in the secondary channel 203 to flow into the at least one valve channel 204 via the inlet 205, thereby allowing for fluid communication between the at least one valve channel 204 and the secondary channel 203 through the inlet 205.

Thus, regardless of the form taken by the microfluidic sealing valve 1, 201, (i.e., regardless of whether a flow of liquid passes through the primary channel 2 (FIG. 2B), or the secondary channel 203 (FIG. 2C)), a capillary force is generated that causes the flow of liquid (from the primary channel 2, 202, or secondary channel 203) to flow through the inlet 5, 205 into the at least one valve channel 4, 204. A meniscus moved by the flow of liquid through the at least one valve channel 4, 204 continues to, then 'pins', at the outlet 6, 206 of the at least one valve channel 4, 204 while a meniscus moved by the flow of liquid through the primary channel 2, 202 'pins' at the first port 8, 208 of the void volume 7, 207.

A cross-sectional area of the first port 8, 208 is configured to be substantially larger than a cross-sectional area of the at least one valve channel 4, 204. In some configurations, a cross-sectional area of the outlet 6, 206 of the at least one valve channel 4, 204 may be equal to the cross-sectional area of the at least one valve channel 4, 204. As a result of the relative sizes of the cross-sectional areas of these various features, a capillary force, generated by the flow of liquid through the at least one valve channel 4, 204 causes the meniscus restrained at the first port 8, 208 to expand from the first port 8, 208 into the primary channel 2, 202 as shown in FIGS. 1C and 1F.

This forms a gaseous bubble which acts to inhibit flow of liquid in the primary channel 2, 202 past the first port 8, 208. Depending on the extent to which the gaseous bubble extends into the primary channel 2, 202, in some configurations the gaseous bubble may act to inhibit, but allow, some flow of liquid in the primary channel 2, 202 past the first port 8, 208. In some other configurations, the gaseous bubble may act to completely prevent liquid in the primary channel 2, 202 from flowing past the first port 8, 208.

In some embodiments, the length of the at least one valve channel 4, 204 partly determines the volume of gas therein displaced by the capillary force generated by the flow of liquid therethrough, and thus may determine the extent to which the gaseous bubble, or meniscus, extends or expands into the primary channel. Therefore, a length of the at least one valve channel 4, 204 determines the extent to which the meniscus restrained at the first port 8, 208 expands from the first port 8, 208 into the primary channel 2, 202 upon generation of the capillary force by the flow of liquid through the at least one valve channel 4, 204. Thus, the length of the at least one valve channel 4, 204 may be configured so that the microfluidic sealing valve 1, 201 may provide a desired flow resistance through the primary channel 2, 202 upon activation thereof.

Therefore, the microfluidic sealing valve 1, 201 acts to inhibit flow of liquid in the primary channel 2, 202 past the first port 8, 208 when triggered by a flow of liquid through that same primary channel 2, 202 (if taking the form of the microfluidic sealing valve 1 of FIGS. 1A-1F, 2A and 2B), or when triggered by a flow of liquid through the secondary channel 203 (if taking the form of the microfluidic sealing valve 201 of FIG. 2C).

In the former instance, for example in the microfluidic sealing valve 1 of FIGS. 1A-1F, 2A and 2B, when the inlet 5 of the at least one valve channel 4 is connected to the primary channel 2, the microfluidic sealing valve 1 can be described as a 'self-sealing' valve, in that the flow of liquid through the primary channel 2 which triggers its operation, is also the same flow of liquid that is inhibited as a result of its operation.

However, in the latter case, for example in the microfluidic sealing valve 201 of FIG. 2C, when the inlet 205 of the at least one valve channel 204 is connected to the secondary channel 203, the microfluidic sealing valve 201 is 'non-self-sealing', as the flow of liquid through the secondary channel 203 that triggers its operation is not necessarily the same flow of liquid in the primary channel 202 that is inhibited as a result of its operation.

Whether the microfluidic sealing valve takes the form of the first embodiment microfluidic sealing valve 1 of FIGS. 1A-1F, 2A and 2B or the second embodiment microfluidic sealing valve 201 of FIG. 2C, is therefore determined by which of the primary channel 2, 202 or the secondary channel 203 the at least one valve channel 4, 204 is in fluid communication with, which is in turn determined by what the inlet 5, 205 of the at least one valve channel 4, 204 connects to.

Therefore, the at least one valve channel 4, 204 being in fluid communication with the primary channel 2, 202 or the secondary channel 203, via the inlet 5, 205 of the at least one valve channel 4, 204, that correspondingly provides a connection between the at least one valve channel 4, 204 and the primary channel 2, 202 or the secondary channel 203, determines whether the microfluidic sealing valve is 'self-sealing' or 'non-self-sealing'.

A further embodiment of a microfluidic sealing valve 301 is shown in FIGS. 3A and 3B, wherein there are two or more of the valve channels 304 connected to the void volume 307. In this embodiment, the outlets 306 of the two or more valve channels 304 provide a connection between the two or more valve channels 304 and the void volume 307.

In this instance, the meniscus 309 restrained at the first port 308 expands from the first port 308 into the primary channel 302 to inhibit flow of liquid in the primary channel 302 past the first port 308 only upon generation of a sufficient capillary force caused when a flow of liquid is incoming in both, or all, of the two or more valve channels 304, or when a flow of liquid is incoming in one of the two or more valve channels 304 while the other of the two or more valve channels 304 already has liquid present therein.

Therefore, this embodiment of the microfluidic sealing valve 301 will only be triggered to operate under the condition that a liquid flow is incoming in both, or all, of the two or more valve channels 304, or when a flow of liquid is incoming in one of the two or more valve channels 304 while the other of the two or more valve channels 304 already has liquid present therein.

Another embodiment of a microfluidic sealing valve 401 is shown in FIGS. 4A and 4B, wherein an intersection of channels 411 is located at the primary channel 402 at or adjacent the void volume 407. In this embodiment, the meniscus 409 restrained at the first port 408 expands from the first port 408 into the primary channel 402 to inhibit flow of liquid in the primary channel 402 past the first port 408, and continues to expand to also inhibit flow of liquid in the intersection of channels 411 past the first port 408 into any of the channels that form the intersection of channels 411. Therefore, this embodiment of the microfluidic sealing valve 401 can be used to inhibit liquid from flowing through more channels than just the primary channel 402.

The above variations of the microfluidic sealing valve 301 and 401 of FIGS. 3A-3B and 4A-4B operate under substantially the same working principles as the microfluidic sealing valve 1 of FIGS. 1A-1F, 2A and 2B where like parts are indicated by the same numerals as FIGS. 1A-1F, 2A and 2B with the addition of 300 and 400 in FIGS. 3A-3B and 4A-4B respectively. Further, the above variations of the microfluidic sealing valve 301 and 401 of FIGS. 3A-3B and 4A-4B operate under substantially the same working principles as the microfluidic sealing valve 201 of FIG. 2C where like parts are indicated by the same numerals as FIG. 2C with the addition of 100 and 200 in FIGS. 3A-3B and 4A-4B respectively.

Further, features described in relation to of each of these embodiments 1, 201, 301 and 401 may be combined to form further embodiments of a microfluidic sealing valve. For instance, embodiments 301 and 401 may have respective valve channels 304, 404 branching off a primary channel 2, 202, and/or off a secondary channel 203, and therefore be triggered to operate due to a flow of liquid in a primary channel 2, 202, or a secondary channel 203, and/or both.

The two or more valve channels 304 of embodiment 301 may even branch off the same or a plurality of different respective channels, therefore only triggering once all respective channels have a flow of liquid passing through them. The embodiment 404 may further comprise more than one valve channel 404, for example, it may have a plurality of valve channels branching off a primary channel 2, 202, off a secondary channel 203, both, and/or off a plurality of different respective channels, therefore only being triggered to operate due to a flow of liquid in a primary channel 2, 202, a secondary channel 203, both, and/or the plurality of different respective channels.

Further examples include the embodiments 1, 201, 301 being provided with the intersection of channels 411 of embodiment 401, therefore acting to inhibit a flow of liquid through both the primary channel 2, 202, 301, and the intersection of channels 411.

An arrangement for a microfluidic circuit that incorporates the aforementioned microfluidic sealing valve will now be described with reference to FIGS. 5A-5C. The microfluidic circuit 20 consists of a main channel 21, a trigger channel 22, and a transistor valve 23. The transistor valve 23 itself includes a first plurality of microchannels 24 extending between and fluidly connecting the trigger channel 22 to the main channel 21. The geometry of the first plurality of microchannels 24 between the trigger channel 22 and the main channel 21 is configured such that a liquid in the main channel 21 is inhibited from flowing into the trigger channel 22 through the first plurality of microchannels 24 unless a liquid is also present in the trigger channel 22 at or adjacent the first plurality of microchannels 24.

In some configurations, the geometry of the first plurality of microchannels 24 between the trigger channel 22 and the main channel 21 is also configured such that liquid in the trigger channel 22 is inhibited from flowing into the main channel 21 through the first plurality of microchannels 24 unless a liquid is also present in the main channel 21 at or adjacent the first plurality of microchannels 24.

As a result, when liquid is present in the trigger channel 22 at or adjacent the first plurality of microchannels 24, or when a flow of liquid passes through the trigger channel 22, the transistor valve 23 permits fluid communication between the liquid in the main channel 21 and the liquid in the trigger channel 23 through the first plurality of microchannels 24, thus allowing the liquids to mix. Therefore, this embodiment of the microfluidic circuit 20 acts as a 'release' valve, wherein liquid in the trigger channel 22 at or adjacent the transistor valve 23 triggers the operation of the transistor valve 23 thereby releasing liquid in the main channel 21 and allowing it to mix with the liquid of the trigger channel 22.

The microfluidic circuit 20 is further arranged with a microfluidic sealing valve, as described above, provided at the trigger channel 22 at a location upstream of the transistor valve 23. In the form shown, the microfluidic sealing valve 1 of FIG. 2B is used; however, any of the embodiments of the microfluidic sealing valve described herein may be used. As such, the trigger channel 22 acts as the primary channel 2 being blocked by the operation of the microfluidic sealing valve 1, as shown in FIG. 5A.

Therefore, during operation of the microfluidic circuit 20, a flow of liquid in the direction A through the trigger channel 22 flows past the first port 8, restraining a meniscus 9 at the first port 8. The flow of liquid then passes through the inlet 5 into the at least one valve channel 4, as shown in FIG. 5B. This generates the capillary force that causes the meniscus 9 to expand into the trigger channel 22, inhibiting liquid in the trigger channel 22 from flowing past the first port 8.

However, at this point in time, the same liquid in the trigger channel 22 has already flowed downstream into and activated the transistor valve 23, releasing the liquid in the main channel 21 and mixing it with the liquid in the trigger channel 22. Therefore, this mixture of liquid in the main channel 21 and trigger channel 22 is prevented from flowing backwards, in the direction B, through the trigger channel 22 and past the first port 8, forcing the mixture to instead continue downstream and exit the microfluidic circuit 20 through an outlet 30.

The outlet 30 may then carry the mixture to peripheral elements in the wider circuit for further analysis or testing, wherein differences in flow resistance between the main channel 21 and the trigger channel 22 determine the mixture's direction of flow. Differences in flow resistance may be created by placing flow resistors or the like at upstream or downstream portions of the wider circuit. Peripheral elements in the wider circuit may also be used to control when and in what order flows of liquid are introduced into the microfluidic circuit 20.

For instance, in the form shown, the main channel 21 is pre-filled with a liquid from a reservoir before another reservoir introduces a flow of liquid into the trigger channel 22. In another form, if the main channel 21 is provided with a vent, the trigger channel 22 may instead be pre-filled first. In that instance, once liquid is introduced into the main channel 21 and reaches a location at or adjacent the transistor valve 23, the transistor valve 23 will activate to 'pull' the liquid in the main channel 21 into the trigger channel 22. Therefore, the functionality of the microfluidic circuit 20 and its transistor valve 23 is not limited to liquids in motion, but may also function with stationary or 'resting' volumes of liquid.

Figure 5A:
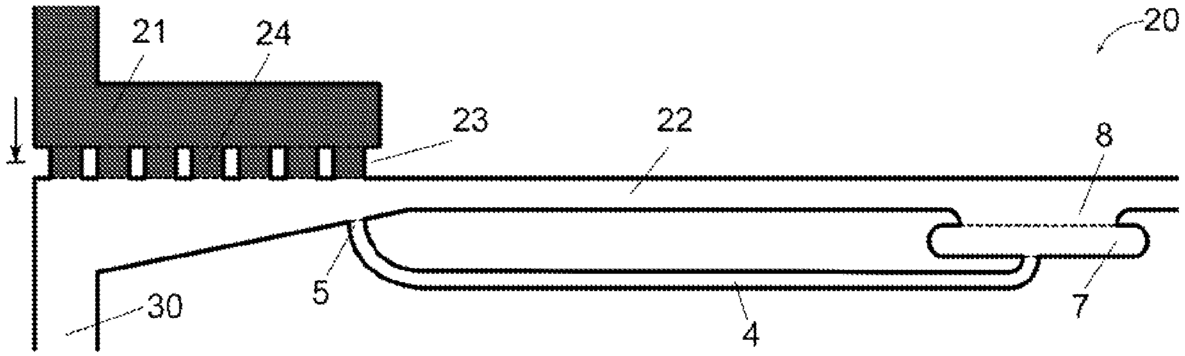
FIG. 5A shows a schematic view of an embodiment of a microfluidic circuit.
Figure 5B:
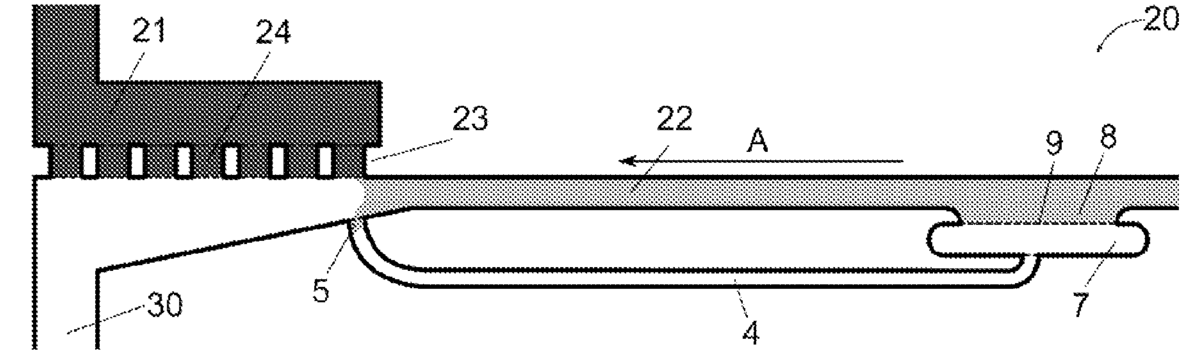
FIG. 5B shows a schematic view of the microfluidic circuit of FIG. 5A with liquid flow through a trigger channel.
Figure 5C:
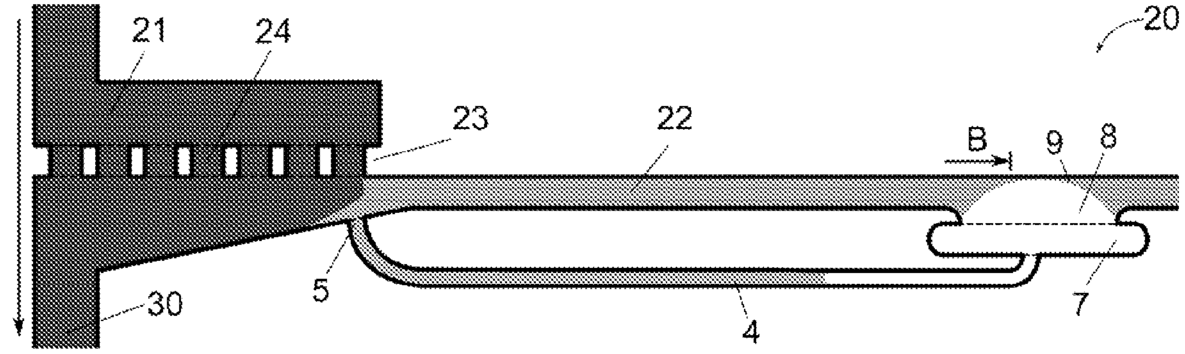
FIG. 5C shows a schematic view of the microfluidic sealing valve of FIG. 5A with the transistor valve in operation.
Figure 6A:
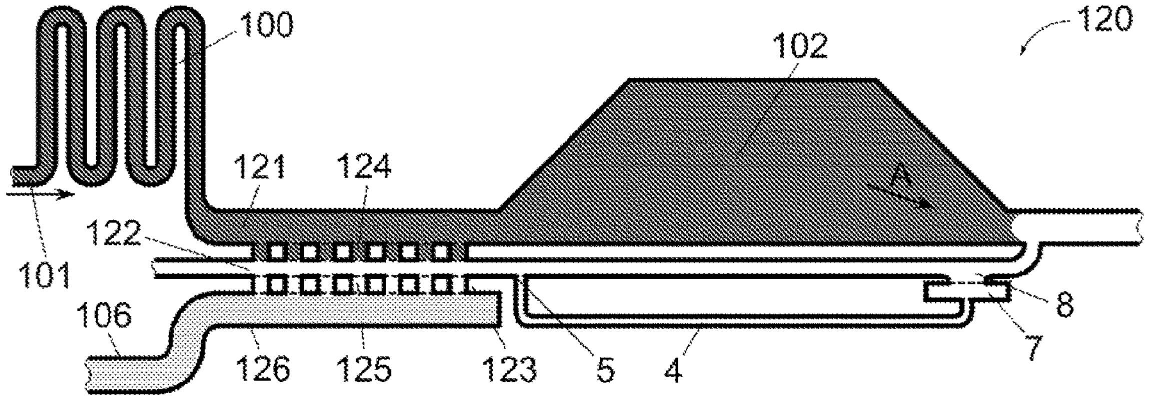
FIG. 6A shows a schematic view of an embodiment microfluidic circuit.
Figure 6B:
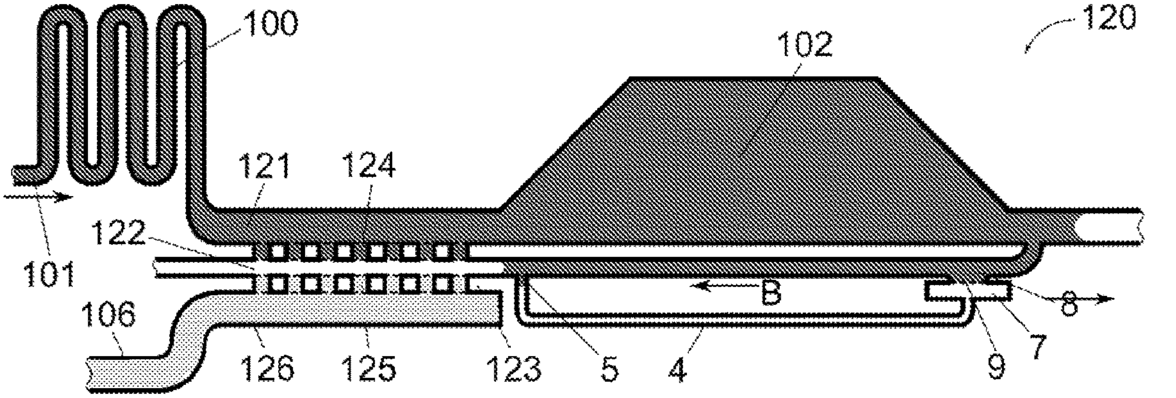
FIG. 6B shows a schematic view of the microfluidic circuit of FIG. 6A with liquid flow through a trigger channel.
Figure 6C:
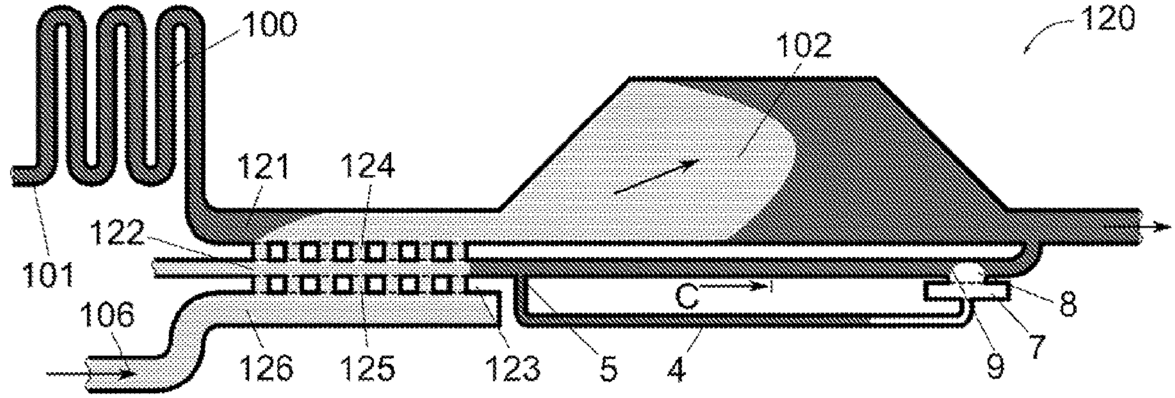
FIG. 6C shows a schematic view of the microfluidic sealing valve of FIG. 6A with the transistor valve in operation.

A further embodiment of the microfluidic circuit 120 is shown in FIGS. 6A-6C. This embodiment of the microfluidic circuit 120 operates under substantially the same working principles as the microfluidic circuit 20 of FIGS. 5A-5C, where like parts are indicated by the same numerals as FIGS. 5A-5C with the addition of 100. In this embodiment of the microfluidic circuit 120, there is additionally provided a supply channel 126, and the transistor valve 123 further includes a second plurality of microchannels 125 extending between and fluidly connecting the trigger channel 122 to the supply channel 126. The second plurality of microchannels 125 is provided adjacent the first plurality of microchannels 124, and in some configurations is provided substantially opposite the first plurality of microchannels 124 in opposing walls of the trigger channel 122.

The geometry of the second plurality of microchannels 125 between the trigger channel 122 and the supply channel 126 is configured such that liquid in the supply channel 126 is inhibited from flowing into the trigger channel 122 through the second plurality of microchannels 125 unless liquid is also present in the trigger channel 122 at or adjacent the second plurality of microchannels 125. Further, liquid in the trigger channel 122 is inhibited from flowing into the supply channel 126 through the second plurality of microchannels 125 unless liquid is also present in the supply channel 126 at or adjacent the second plurality of microchannels 125.

When liquid is present in the trigger channel 122 at or adjacent the first plurality of microchannels 124 and the second plurality of microchannels 125, or when a flow of liquid passes through the trigger channel 122, fluid communication is permitted between the liquid in the main channel 121, the liquid in the trigger channel 122 and the liquid in the supply channel 126 through the first and second plurality of microchannels to permit the liquids to mix.

As a result, liquid in the trigger channel 122 at or adjacent the transistor valve 123 causes the transistor valve 123 to permit fluid communication between liquid in the main channel 121 and liquid in the trigger channel 122 through the first plurality of microchannels 24, and further permits fluid communication between liquid in the supply channel 126 and liquid in the trigger channel 122 through the second plurality of microchannels 125. Therefore, this embodiment of the microfluidic circuit 120 acts as a 'two-way release' valve, wherein liquid in the trigger channel 122 at or adjacent the transistor valve 123 triggers the operation of the transistor valve 123 thereby releasing the liquid in the main channel 121 and supply channel 126, allowing them to mix with the liquid in the trigger channel 122 and with each other.

Much like the microfluidic circuit 20 of FIGS. 5A-5C, the microfluidic circuit 120 of FIGS. 6A-6C is further arranged with a microfluidic sealing valve as described above provided at the trigger channel 122 at a location upstream of the transistor valve 123. In the form shown, the microfluidic sealing valve 1 of FIG. 2B is used; however, any of the embodiments of the microfluidic sealing valve described herein may be used. Once more, the trigger channel 122 acts as the primary channel 2 being blocked by the operation of the microfluidic sealing valve 1, as shown in FIG. 6A.

During operation of the microfluidic circuit 120, a flow of liquid through the main channel 121, in the direction A, passes into the trigger channel 122. The flow of liquid through the trigger channel 122 flows past the first port 8, in the direction B, restraining a meniscus 9 at the first port 8. The flow of liquid then passes through the inlet 5 into the at least one valve channel 4, as shown in FIG. 6B. This generates the capillary force that causes the meniscus 9 to expand into the trigger channel 122, inhibiting flow of liquid in the trigger channel 122 past the first port 8.

However, at this point in time, the same liquid in the trigger channel 122 has already flowed downstream into and activated the transistor valve 123, releasing the liquid in the main channel 121 and the supply channel 126. Therefore, the mixture of liquid in the main channel 121, trigger channel 122, and supply channel 126 is prevented from flowing backwards, in the direction C, through the trigger channel 122, as shown in FIG. 6C.

Much like in the microfluidic circuit 20, differences in flow resistance may be created by placing flow resistors or the like at upstream or downstream portions of the wider circuit therefore influencing the direction of flow. In the form shown, the microfluidic circuit 120 incorporates an upstream flow resistor 100 which acts to decrease the pressure at the main channel 121. As such, when the transistor valve 123 is triggered and fluid communication between the various channels begins, the resulting mixture will flow into the main channel 121 then be carried into a retention reservoir 102 due to the lower flow resistance in the main channel 121 compared to the high flow resistance in the now inhibited trigger channel 122. The retention reservoir 102 helps to ensure the mixture is given adequate time to completely react before continuing downstream for analysis or testing.

Peripheral elements on the wider circuit may also be used to control when and in what order flows of liquid are introduced into the microfluidic circuit 120. For instance, in the form shown, the supply channel 126 is pre-filled from a first reservoir 106 before a second reservoir 101 introduces a flow of liquid into the main channel 121. Therefore, the functionality of the microfluidic circuit 120 and its transistor valve 123 is not limited to liquids in motion, but may also function with stationary or 'resting' volumes of liquid.

Figure 7:
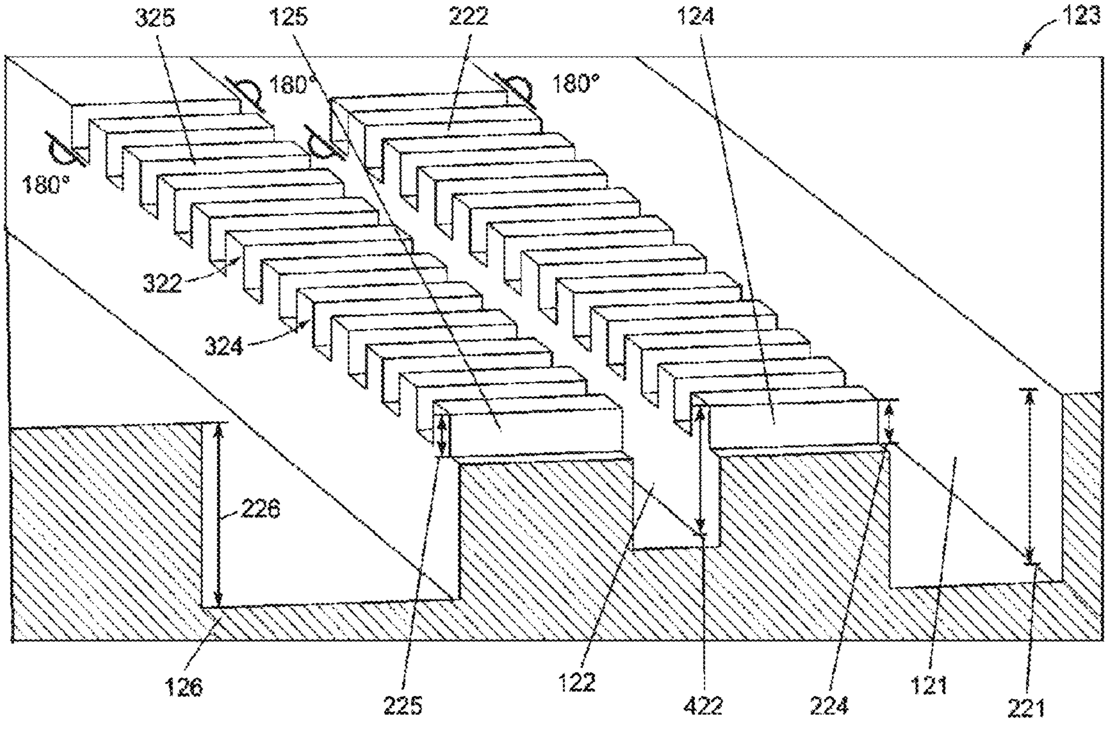
FIG. 7 shows a cross-sectional view of an embodiment of a transistor valve.

FIG. 7 shows a cross-sectional view of the transistor valve 123 of the microfluidic circuit 120 of FIGS. 6A-6C, which operates under the same working principles as the transistor valve 23 of the microfluidic circuit 20 of FIGS. 5A-5C, where like parts are indicated by the same numerals as FIGS. 5A-5C with the addition of 100 in FIGS. 6A-6C. An inner peripheral wall 222 of the trigger channel 122 located at or adjacent the first plurality of microchannels 24, 124 is angled at about 180 degrees or more relative to an imaginary plane 324 extending across the first plurality of microchannels 24, 124, as shown in FIG. 7.

Further, the first plurality of microchannels 24, 124 are prescribed a depth 224 which is typically shallower than a depth 221 of the main channel 21, 121, more specifically, the depth 224 of the first plurality of microchannels 24, 124 is up to about 75% of the depth of the main channel 21, 221. In some configurations, the depth 224 of the first plurality of microchannels 24, 124 may be 1-75%, 25-75%, or 50-75% of the depth 221 of the main channel 21, 121. In some configurations, the depth 224 of the first plurality of microchannels 24, 124 is also generally shallower than a depth 422 of the trigger channel 22, 122.

These differences in depth, in combination with the relative angle between the imaginary plane 324 extending across the first plurality of microchannels 24, 124 and the inner peripheral wall of the trigger channel 222 ensure both that liquid in the main channel 21, 121 is inhibited from flowing into the trigger channel 22, 122 through the first plurality of microchannels 24, 124 unless liquid is also present in the trigger channel 22, 122 at or adjacent the first plurality of microchannels 24, 124; and that liquid in the trigger channel 22, 122 is inhibited from flowing into the main channel 21, 121 through the first plurality of microchannels 24, 124 unless liquid is present in the main channel 21, 121 at or adjacent the first plurality of microchannels 24, 124.

These geometric constraints of the first plurality of microchannels 24, 124 ensure adequate surface tension effects that prevent liquid from simply seeping through the first plurality of microchannels 24, 124 while also retaining a substantially instantaneous mixture time once the transistor valve is activated by liquid in the trigger channel 22, 122.

The second plurality of microchannels 125 of the transistor valve 123 are configured in substantially the same manner, wherein an inner peripheral wall of the trigger channel 322 located at or adjacent the second plurality of microchannels 125 is angled at about 180 degrees or more relative to an imaginary plane 325 extending across the second plurality of microchannels 125, as shown in FIG. 7. Further, as shown in FIG. 7, the second plurality of microchannels 125 are prescribed a depth 225 which is typically shallower than a depth 226 of the supply channel 126.

More specifically, the depth 225 of the of second plurality of microchannels 125 is up to about 75% of the depth 226 of the supply channel 126. In some configurations, the depth 225 of the second plurality of microchannels 125 may be 1-75%, 25-75%, or 50-75% of the depth 226 of the main channel 126. It should be further noted that the depth 224 of the first plurality of microchannels 24, 124 and the depth 225 of the second plurality of microchannels 125 are also generally shallower than a depth 221 of the main channel 21, 121, a depth 422 of the trigger channel 22, 122, and/or a depth 226 of the supply channel 126.

These differences in depth, in combination with the relative angle between the imaginary plane 325 extending across the second plurality of microchannels 125 and the inner peripheral wall of the trigger channel 322 ensure both that liquid in the supply channel 126 is inhibited from flowing into the trigger channel 122 through the second plurality of microchannels 125 unless a liquid is also present in the trigger channel 122, and that a liquid in the trigger channel 122 is inhibited from flowing into the supply channel 126 through the second plurality of microchannels 125 unless a liquid is also present in the supply channel 126.

These geometric constraints of the second plurality of microchannels 125 ensure adequate surface tension effects that prevent liquid from simply seeping through the second plurality of microchannels 125 while also retaining a substantially instantaneous mixture time once the transistor valve is activated by liquid in the trigger channel 22, 122.

The application and use of the microfluidic sealing valves 1, 201, 301, 401, the transistor valves 23, 123 and the microfluidic circuits 20, 120 in a test chip setup will now be described with reference to experimental testing and data acquired therefrom.

EXPERIMENTAL TESTING AND RESULTS

To demonstrate the enhanced functionality of the microfluidic sealing valves, transistor valves and microfluidic circuits described above, a test chip setup was created to illustrate the reduced flow resistance and improved timing achieved by implementation of the aforementioned embodiments of the invention.

The test chip was fabricated from crosslinked Polymethyl-methacrylate (PMMA) chosen for its good mechanical stiffness for milling, as well as chemical resistance to solvents. Milling of channels was performed using a Mini-Mill/GX running a NSK-3000 Spindle (Minitech Machinery Corporation), which has a minimum step width of 1 μm. Machining tools were received from Performance Micro Tool in diameters of 3.175 mm (SR-4-1250-S), 250 μm (250M2×750S), 100 μm (100M2×300S) for the square head, and 200 μm (TR-2-0080-BN) for the ball nose head. Design files were prepared using computer-aided-design (CAD) software such as Fusion360 and Autodesk which then outputted appropriate milling parameters in G-code format.

In brief, every sample was fabricated by an initial face cut to level out the surface, followed by milling of each channel and/or feature. Milling of shallower channels was done first to avoid burring on the edges. Afterwards, the surface was polished with acrylic polish (Aluminum oxide based, CRC, Code 9230), followed by ultra-sonication for 1 min in about 5% aqueous isopropyl alcohol solution followed by further washing with acetone, isopropyl alcohol and water and finally blow drying with nitrogen.

To close microscopic cracks that arise in the milling process, the surface was coated with high-molecular weight ($M_w$) PMMA solution (Average $M_w$=996000, 2.5% in Xylene, chemicals received from Sigma Aldrich) by immersion, with any excess wiped off with a cleanroom wipe. Any remaining solvent was removed by drying samples at 90° C. for 5 min on a hotplate and keeping the hot sample under vacuum for at least 1 min. This process did not change the geometry significantly, although the edge flow that may be expected for rectangular channels was observed to be reduced, which may indicate a slight rounding that was too small to be observed in a light microscope.

Finally, samples were plasma-treated 5 times, each time for 1 min at 25 W using Oxygen ($O_2$) gas (Tergeo plasma cleaner, Pie Scientific) while 30 nm of Silicone Dioxide ($SiO_2$) were sputtered (Edwards Auto500 DC/RF Magnetron Sputtering System) onto the surface to create a robust and permanently hydrophilic layer. The test chip was then reversibly covered by a layer of hydrophobic material, in particular Polydimethylsiloxane (PDMS), to ensure an adequate seal.

Figure 8A:
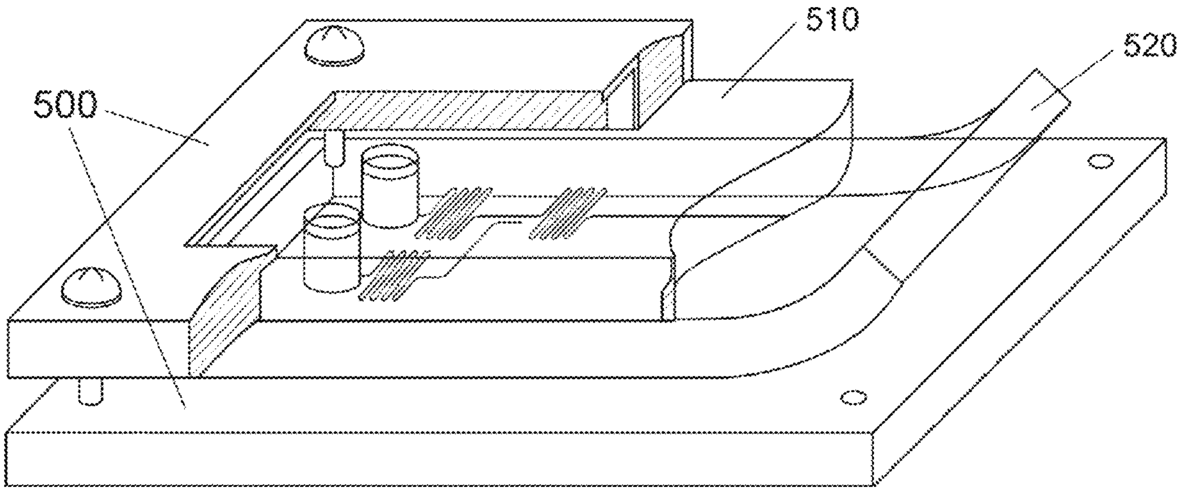
FIG. 8A shows the arrangement of an embodiment of a microfluidic circuit test chip assembly used to gather experimental data.

This can be seen in FIG. 8A, where an aluminium frame 500 is used to constrain and seal the PMMA test chip 510 to the layer of hydrophobic PDMS 520. While this test chip setup is one example of how a microfluidic circuit can be prepared for testing, it should be noted that the microfluidic sealing valves 1, 201, 301, 401 and microfluidic circuits 20, 120 described herein can be provided with a layer of hydrophobic material to ensure correct meniscus pinning during a flow of liquid through any of the various circuit channels or features. The layer of hydrophobic material may be substituted with an opposing mirror image test chip, so that corresponding circuit channels or features are sealed by an opposing and matching circuit channel or feature. However, such a setup is more complex to manufacture, especially if the setup is only being used for experimental testing and validation.

All flow experiments were conducted by adding aqueous food dye solution (Blue: Hansells Baking (Brilliant blue FCF, 1.8%); Red: Hansells Baking (Ponceu 4R, 3.3%); Yellow: Queen Fine Foods Pty. Ltd. (Tartazine and Azorubine, 2.3%)) into reservoirs using a manual pipette. Liquid movement was recorded using a digital camera (Canon EOS 760D using a Canon Macro lens EF 100 mm 1:2.8 USM, recorded at 25 FPS) and the footage was evaluated by conversion into an .avi raw format (ffmpeg, Version N-94405-g43891ea8ab). Background subtraction, binarization of the video and extraction of the mean brightness value over the region of interest were performed in ImageJ (Fiji 1.52p). In the binarization process, the software turns each pixel into a black or white pixel, depending on the brightness. Thus, pixels close to the threshold value tend to switch between black and white, creating noise in the evaluation. Flow rates were estimated based on the measured device geometry and injected sample volume.

The first feature tested on the test chip was the 'self-sealing' microfluidic sealing valve 1 of FIG. 2B. Assuming the meniscus 9 forms a half dome shape at the first port 8 the radius of the resulting gaseous bubble can then be determined as half of the width of the first port 8. The capillary pressure generated at the gaseous bubble at the first port 8 meanwhile correlates with the radius by the Laplace equation:

$$\Delta P = \gamma\left(\frac{1}{r_1} + \frac{1}{r_2}\right)$$

where $\gamma$ is the surface tension and $r_1$ and $r_2$ are the radii of an ellipsoidal spheroid surface ($r_1$=$r_2$ for a perfect sphere). The capillary pressure generated by the flow of liquid through the valve channel 4 needs to overcome this gaseous bubble capillary pressure at the first port 8 in order for the meniscus 9 to expand into, and inhibit flow through, the primary channel 2.

Figure 8B:
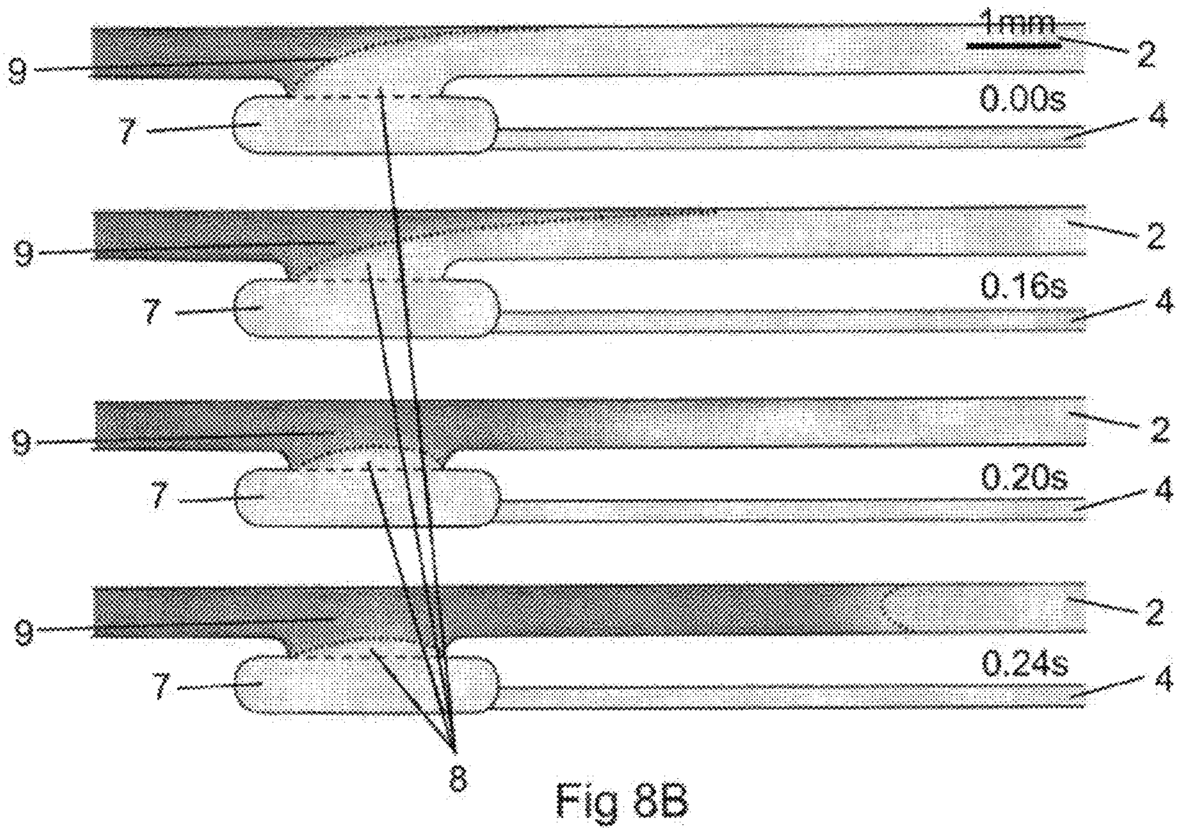
FIG. 8B shows a time lapse of an embodiment of a microfluidic sealing valve in operation.

Filling of the entire microfluidic sealing valve does not strictly follow regular capillary flow, as the symmetry of the primary channel 2 is broken at the first port 8. Instead, capillary action is defined by only three walls and therefore meniscus progression is slowed down. FIG. 8B shows a sequence of images illustrating the capillary flow in part of the microfluidic sealing valve 1. As can be observed at the start, the meniscus 9 moved by a flow of liquid through the primary channel 2, 'pins' on one side of the first port 8, slowing down the progression of the flow of liquid. Once, after 0.2 s, the meniscus 9 reaches the other side of the first port 8, the flow of liquid continues past the first port 8 developing a liquid front that more rapidly progresses down the primary channel 2. In the rectangular primary channel 2 used here, capillary flow was observed to be dominated by edge-flow, a phenomenon that appears due to very high capillary pressures in sharp edges of a channel.

It has been previously mentioned, with reference to any embodiment of the microfluidic sealing valve, that capillary force generated by a liquid flow is the principal mode by which the meniscus restrained at the first port 8, 208, 308, 408 expands and inhibits a flow of liquid in the primary channel 2, 202, 302, 402. Since the size of capillary force, or pressure, generated by flow of liquid through a channel is determined in part by the cross-sectional area of the channel it flows through, the higher the difference in relative size of the cross-sectional area of the first port 8, 208, 308, 408 and the cross-sectional area of the at least one valve channel 4, 204, 304, 404, the more instantaneous and more effective the microfluidic sealing valve becomes at inhibiting flow through a channel upon activation.

Figure 9A:
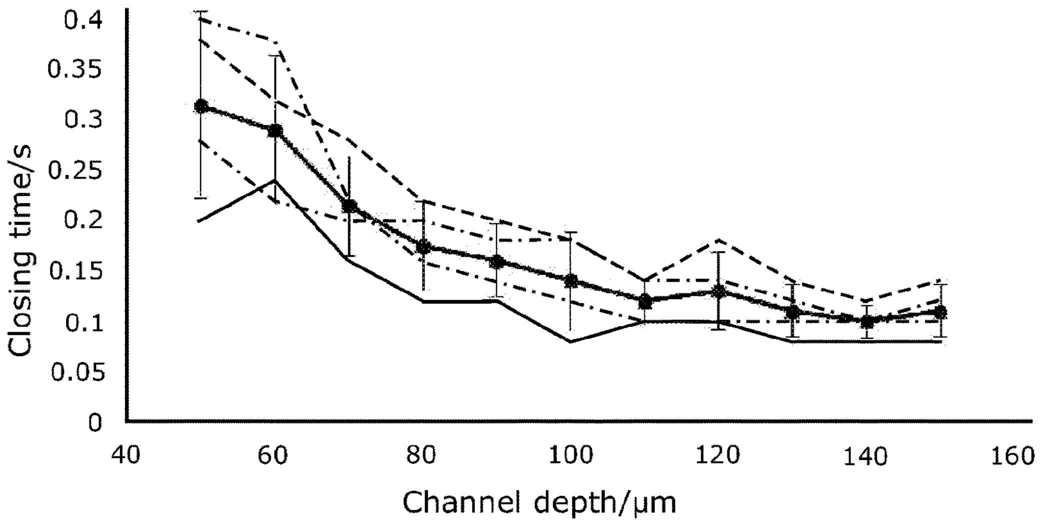
FIG. 9A shows a graph displaying the relationship between sealing time and the depth of the valve channel for a 100 μm wide valve channel.
Figure 9B:
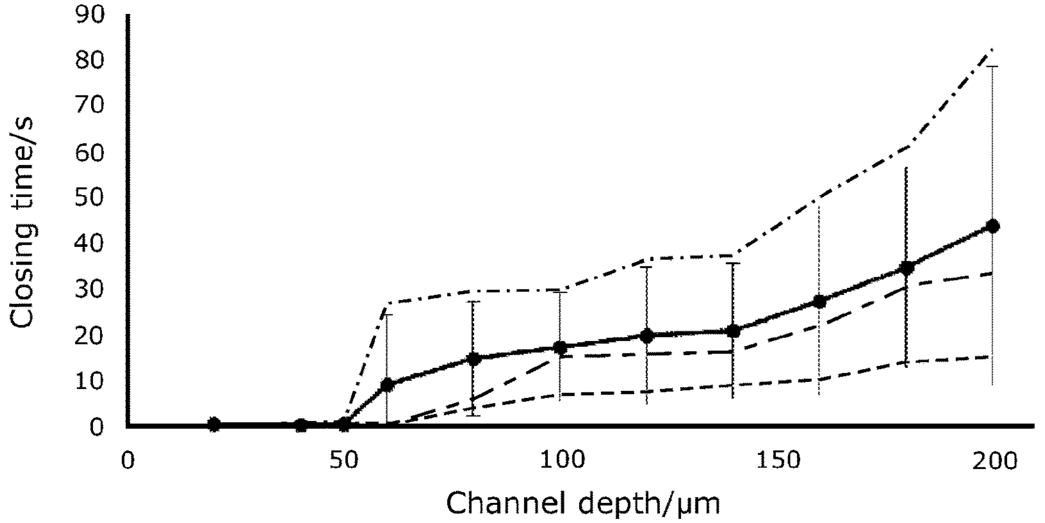
FIG. 9B shows a graph displaying the relationship between sealing time and the depth of the valve channel for a 250 μm wide valve channel.
Figure 9C:
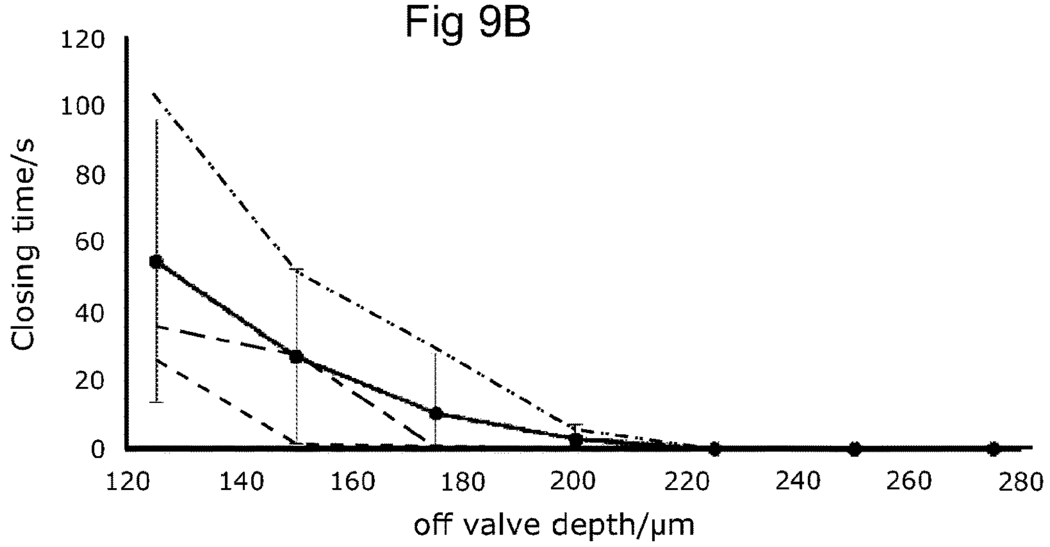
FIG. 9C shows a graph displaying the relationship between sealing time and the depth of the primary channel for a 250 μm wide valve channel.

The relationship between valve channel width and sealing time can be seen in FIGS. 9A-9C. These figures each show differently-dashed lines corresponding to different results from experimental tests, with the average results represented by the solid line and solid dots. Margins of error, or differences between the maximum and minimum values of the experimental tests are represented by the vertical solid bars that extend from each of the solid dots. A test setup of the microfluidic sealing valve 1 was created wherein a 100 μm wide valve channel 4 with varying depths is tested in FIG. 9A and a 250 μm wide valve channel 4 with varying depths is tested in FIG. 9B.

It can be seen that in FIG. 9A, when width of the valve channel 4 is very small at 100 μm, the closing or sealing times lie below 0.4 s. The main influence on sealing times appears to be flow resistance, as the sealing times decrease in proportion to the increasing depth of the valve channel 4, and therefore in proportion to decreased flow resistance through the valve channel 4.

By contrast, when using wider valve channels 4, sealing times are more directly influenced by differences in capillary pressure as outlined above. Therefore, when using the 250 μm wide valve channel 4 in FIG. 9B, closing or sealing times are magnitudes larger, at or around 10-30 s, and increase with increasing depth of the valve channel 4, as the relative difference in cross-sectional area of the first port 8 and the valve channel 4 consequently decreases.

In FIG. 9C, the width and depth of the valve channel 4 is kept constant at 250 μm and 50 μm respectively, with the depth of the primary channel 2 (and therefore first port 8) increasing. Closing or sealing times decreased with the increasing depth of the primary channel 2/first port 8, as the relative difference in cross-sectional area of the first port 8 and the valve channel 4 increase. It was found that optimal sealing times were achieved with a primary channel/first port 8 depth of at least 200 μm.

FIGS. 9A-9C all show relatively large margins of error in sealing times between different experiments within each figure. These margins of error are related to the sealing method used when manufacturing the test chips. PDMS sealing atop the test chips can result in variations in the effective channel heights and thus offset the data values derived from the different experiments. Further, environmental parameters such as air moisture and temperature add further variation to the entire test chip. However, error ranges for one particular experiment were found to be significantly smaller than the error bars of FIGS. 9A-9C suggest. In any case, the general trends and relationships discussed above in relation to FIGS. 9A-9C were consistent despite the apparent numeric differences.

Future designs may have varying widths in the trigger channel 4 to achieve a more instantaneous sealing while also preventing excess migration of the meniscus 9 into the primary channel 2.

Occasionally, the meniscus 9 is unable to expand completely into the edges of the primary channel 2, leaving a thin fluid connection remaining. However, the flow through the primary channel 2 is still inhibited. This may be addressed by rounding the primary channel 2 profile and further optimizing the geometry of the microfluidic sealing valve 1. Another observation from the testing of the microfluidic sealing valve 1 was that the meniscus 9 at the first port 8 appears to be bent slightly inwards during initial filling, enhancing the meniscus 9 stability at the first port 8. However, manufacturing errors could potentially destabilize the meniscus 9 leading to failure of the microfluidic sealing valve 1. This can be counteracted by increasing the angle between the inner peripheral wall 12 of the void volume 7 and the imaginary plane 13 extending across the first port 8 to greater than 180 degrees, therefore increasing the surface tension effects which cause the meniscus 9 to 'pin' to the first port 8.

Figure 10:
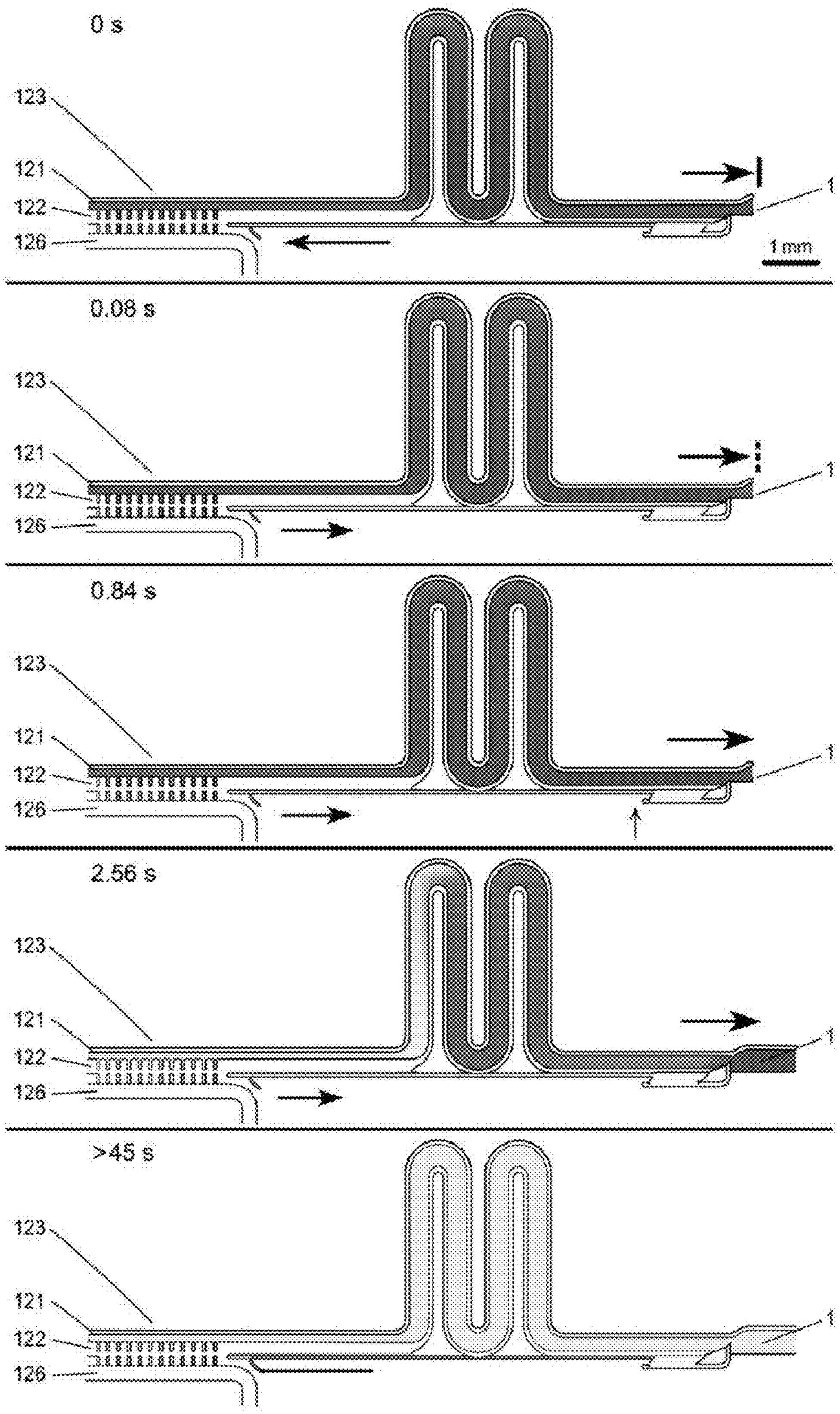
FIG. 10 shows a time lapse of the microfluidic circuit of FIG. 6A in operation.

The second feature tested on the test chip was the microfluidic circuit 120 of FIGS. 6A-6C. To visualize the flow behaviour inside the transistor valve 123 and various channels, the supply channel 126 was filled with a first-coloured water (represented in FIG. 10 by a lighter tone) and the main channel 121 with a second-coloured water (represented in FIG. 10 by a darker tone). The two colours were chosen to yield a large visual contrast so that even the faintest mixing could be observed. As can be seen in FIG. 10, triggering induces a flow of liquid from the second-coloured water reservoir into the main channel 121. This rapid flow of liquid results in near instantaneous (around 0.04-0.08 s) triggering of the transistor valve 123. This speed in triggering of the transistor valve 123 can be explained by the flow resistance from the first-coloured water of the supply channel 126 being negligible in comparison to the flow resistance of the narrower trigger channel 122. The higher resistance in the trigger channel 122 being provided by an upstream resistor (not shown) similar to the flow resistor 100 provided upstream of the main channel 121 shown in FIGS. 6A-6C. With the microfluidic sealing valve 1 provided at the trigger channel 122, a residual backflow of the mixture of liquids in the main channel 121 and supply channel 126 through the trigger channel 122 could be prevented thanks to the complete sealing of the trigger channel 122 after around 1-3 s.

To demonstrate the applicability of the transistor valve 123, another test setup was created in which three duplicate circuits were embedded on a single chip, each one having a different length of the trigger channel 122 leading to and activating the transistor valve 123. Preceding the transistor valve 123 was an upstream primary resistor R1, which was used to represent a long and/or complex microfluidic circuit. The upstream primary resistor R1 was composed of a main channel 121 and a supply channel 126 meeting at the transistor valve 123. Provided adjacent the transistor valve 123 was the trigger channel 122 which acted as a timing resistor R2. Immediately downstream of the timing resistor R2 is provided an evaluation resistor R3 composed of a reference channel that is only used to monitor the filling volume and thus the flow rates through R2 and R3.

Figure 11A:
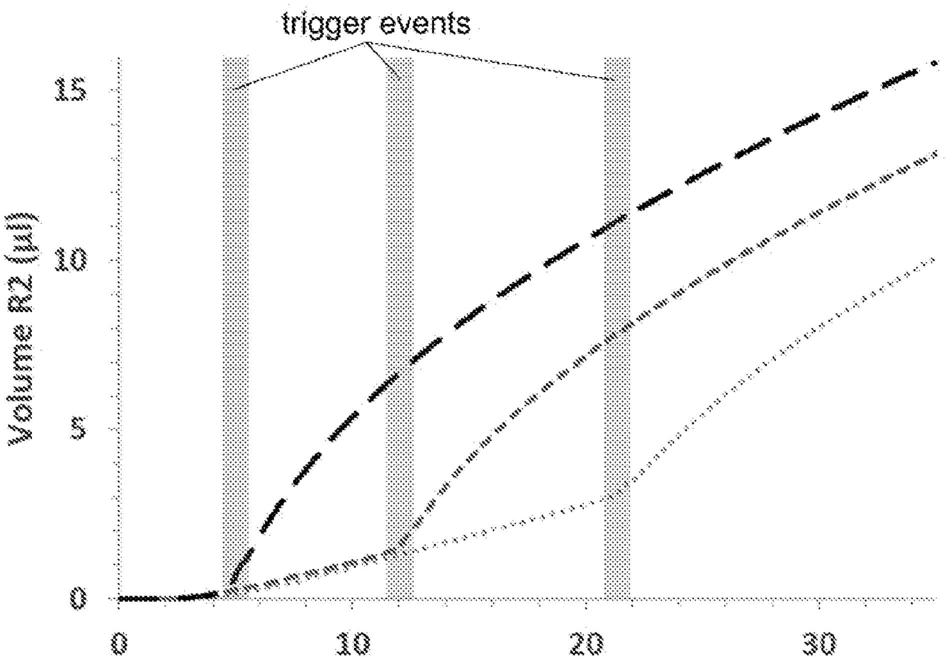
FIG. 11A shows a graph displaying the relationship between liquid volume at the timing resistor and time since the triggering event.
Figure 11B:
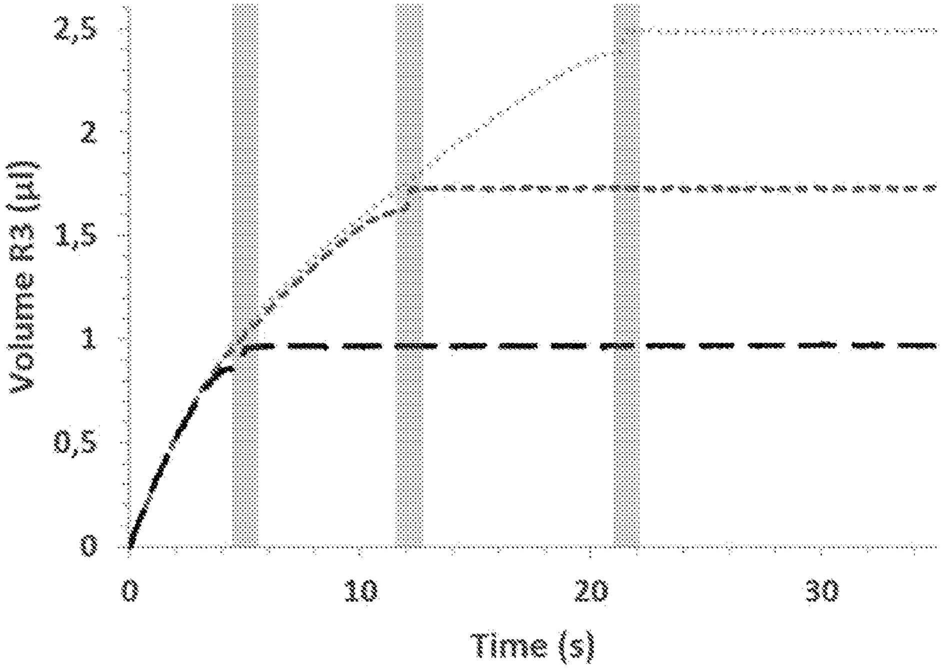
FIG. 11B shows a graph displaying the relationship between liquid volume at the evaluation resistor and time since the triggering event.
Figure 11C:
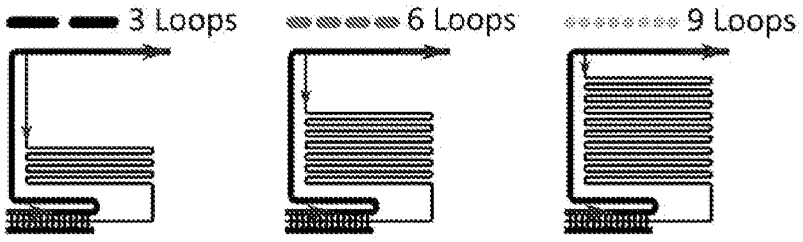
FIG. 11C shows a key representing the different trigger channel configurations tested.

FIGS. 11A and 11B show graphs displaying the relationship between liquid volume (μl) at the timing resistor R2, and liquid volume (μl) at the evaluation resistor R3 vs. time (s) since the triggering event. Vertical bars are shown on both FIGS. 11A and 11B and represent the time of the trigger event. FIG. 11C shows a key representing the different trigger channel 122 configurations tested, the first one having only 3 loops, the second one having 6 loops, and the third one having 9 loops.

When the flow of liquid enters the trigger channel 122 of the timing resistor R2, the flow behaviour in the trigger channel 122 is initially similar to regular capillary flow in a straight capillary until shortly before the triggering event. This regular capillary flow can be described by:

$$V(t) \sim L(t) \sim \sqrt{\frac{\Delta P \cdot t}{L}}$$

where V(t) is the volume, L(t) is the meniscus position, ΔP is the difference in capillary pressure, L is the length of the filled channel section and t is the time. The liquid volume flow in the evaluation resistor R3 on the other hand is strongly reduced during the filling time of the timing resistor R2. Liquid is drained into the significantly smaller trigger channel 122, reducing the flow in evaluation resistor R3 to almost zero. With increasing filling of timing resistor R2, the flow resistance increases and allows liquid to be pulled into evaluation resistor R3. During the triggering event, the liquid in the evaluation resistor R3 shows a regular capillary flow behaviour as described above.

Figure 12A:
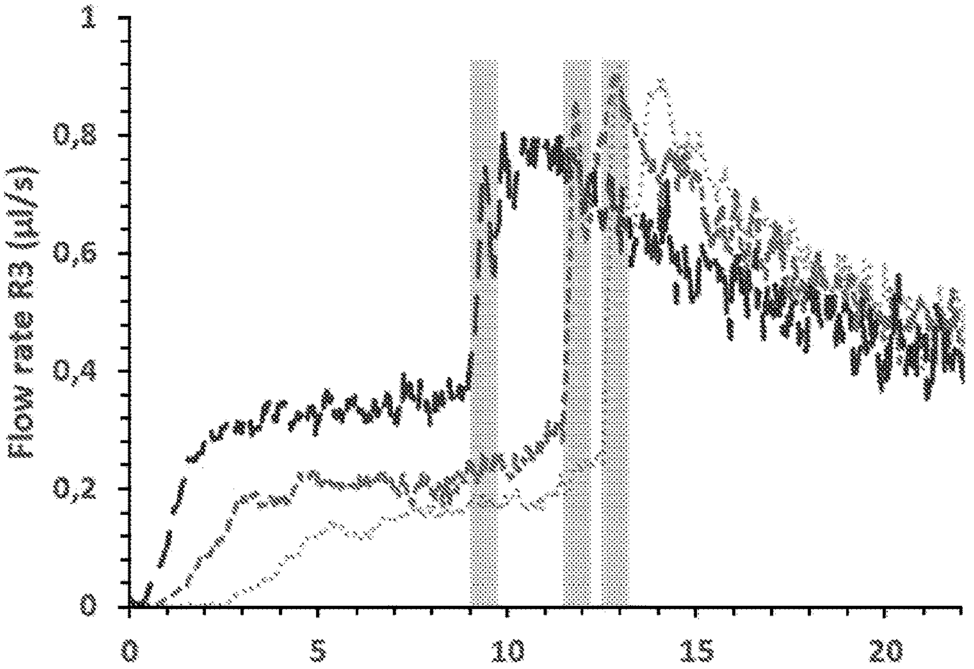
FIG. 12A shows a graph displaying the relationship between liquid flow rate at the evaluation resistor and time since the triggering event.
Figure 12B:
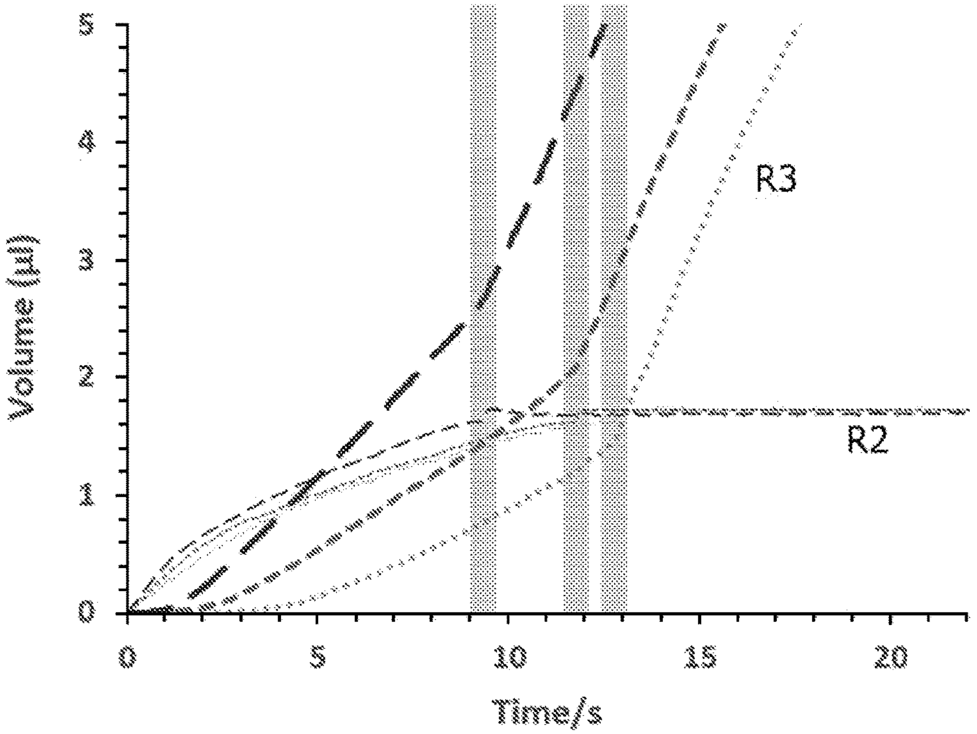
FIG. 12B shows a graph displaying the relationship between liquid volume at the evaluation resistor and time since the triggering event as well as the relationship between liquid volume at the timing resistor and time since the triggering event.
Figure 12C:
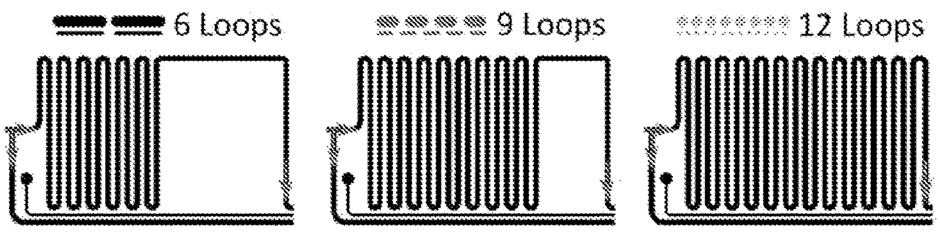
FIG. 12C shows a key representing the different trigger channel configurations tested.

The test was repeated this time with different lengths of the trigger channel 122 being tested, one with 6 loops, one with 9 loops, and one with 12 loops. FIG. 12A show graphs displaying the relationship between liquid flow rate (μl/s) at the evaluation resistor R3 and time since the triggering event, in seconds. FIG. 12B show graphs displaying the relationship between liquid volume (μl) at the evaluation resistor R3 vs. time (s) since the triggering event and liquid volume (μl) at the timing resistor R2 vs. time (s) since the triggering event. Vertical bars are shown on both FIGS. 12A and 12B and represent the time of the trigger event. FIG. 12C shows a key representing the different trigger channel configurations tested.

It can be observed from FIGS. 12A and 12B that when changing the pre-set flow resistance by changing the length of primary resistor R1, the flow rate suddenly increases significantly during the triggering event. The maximum and end flow rate is roughly the same, as the flow resistance is dominated by the low resistance through the transistor valve 123. Differences in maximum flow rates are mainly due to the higher volume in the evaluation resistor R3 at the point of the triggering event and noise arising from the binarization of the footage. The latter does not increase with time but depends on the filling volume, or rather the areas of black pixels on the binarized video.

Trigger timing is influenced by the pre-set flow resistance of the primary resistor R1 as the vertical bars in FIGS. 12A and 12B suggest, with the filling of the trigger channel 122 at the timing resistor R2 slowed down. This effect appears to decrease with increasing pre-set resistance of the primary resistor R1. The vertical bars in FIGS. 11A, 11B, 12A and 12B also demonstrate that the time taken for the liquid volume at the timing resistor R2 and the evaluation resistor R3 to reach a given value is consistent with the length of the trigger channel 122. This demonstrates the improved consistency and control of timing achieved through the application of the transistor valves 23, 123 described above. This also demonstrates that timing can be controlled regardless of the length or complexity of the preceding microfluidic circuit represented by the primary resistor R1. This is of particular applicability to 'lab-on-a-chip' (LOAC) and 'point-of-care' (POC) devices which are typically embedded with complex microfluidic circuits.

The improved functionality also allows for application of the microfluidic circuits described above in immunoassays devices, such as those used in ELISA (enzyme-linked immunosorbent assay) for detecting and quantifying substances such as peptides, proteins, antibodies and hormones. These devices require a timed sequence of mixing of different solutions. Utilising the transistor valve 123 and microfluidic sealing valves 1, 201 allows one to automate this sequence so that only a single addition of water is required in place of multiple chemical additions with multiple pipetting steps and operator inputs. All chemicals can therefore be pre-loaded into the system in a dry state or as needed.

To prove this concept, a circuit was designed to draw liquid from only one reservoir into three channels 611, 612, 613 containing dried dye, which was subsequently released into a chamber 601. A parallel arrangement of the transistor valve 123 of the microfluidic circuit 120 of FIGS. 6A-6C was used to trigger the switch between each channel. Dosing was conducted through the volume of each capillary pump.

Figure 13A:
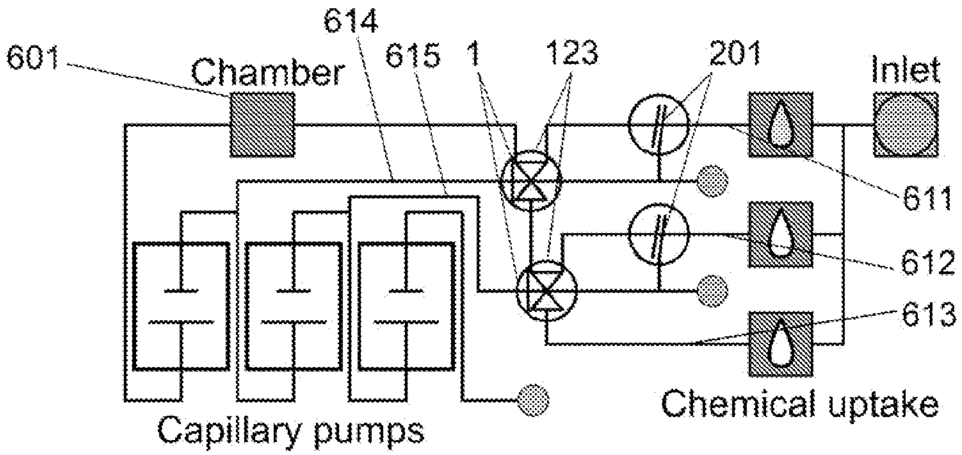
FIG. 13A shows a circuit diagram representation of a test circuit.
Figure 13B:
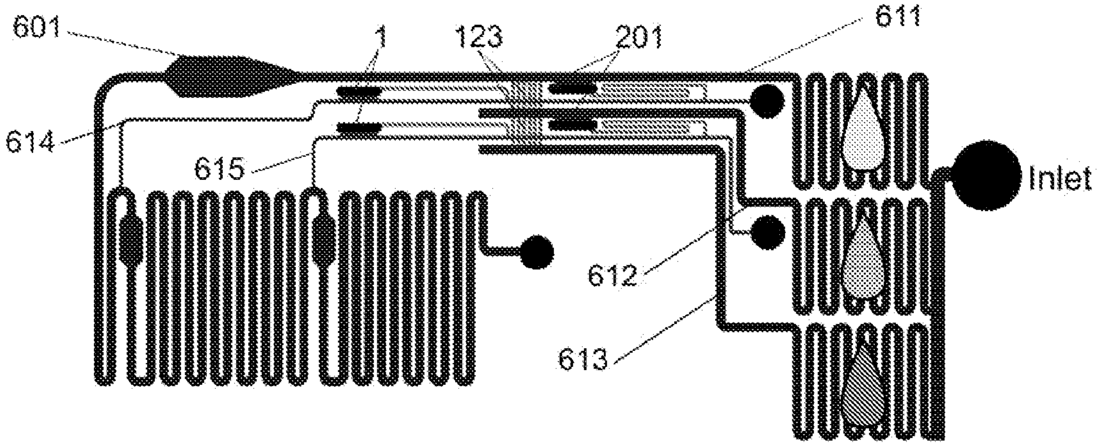
FIG. 13B shows a simplified channel diagram of the test circuit of FIG. 13A.

In this setup, as shown in FIG. 13B, a first channel 611, second channel 612 and third channel 613 are filled first. After passing a chamber 601, the liquid in the first channel 611 enters a first valve channel 614. This first valve channel 614 triggers a transistor valve 123, permitting fluid communication between the first channel 611 and the second channel 612 allowing their liquids to mix. The mixture is prevented from flowing back through the first valve channel 614 due to the microfluidic sealing valve 1 of FIGS. 1A-2B provided at the first valve channel 614, meanwhile, further flow through the first channel 611 is inhibited by the microfluidic sealing valve 201 of FIG. 2C, provided upstream of the transistor valve 123, triggered by the flow through the first valve channel 614.

Figure 13C:
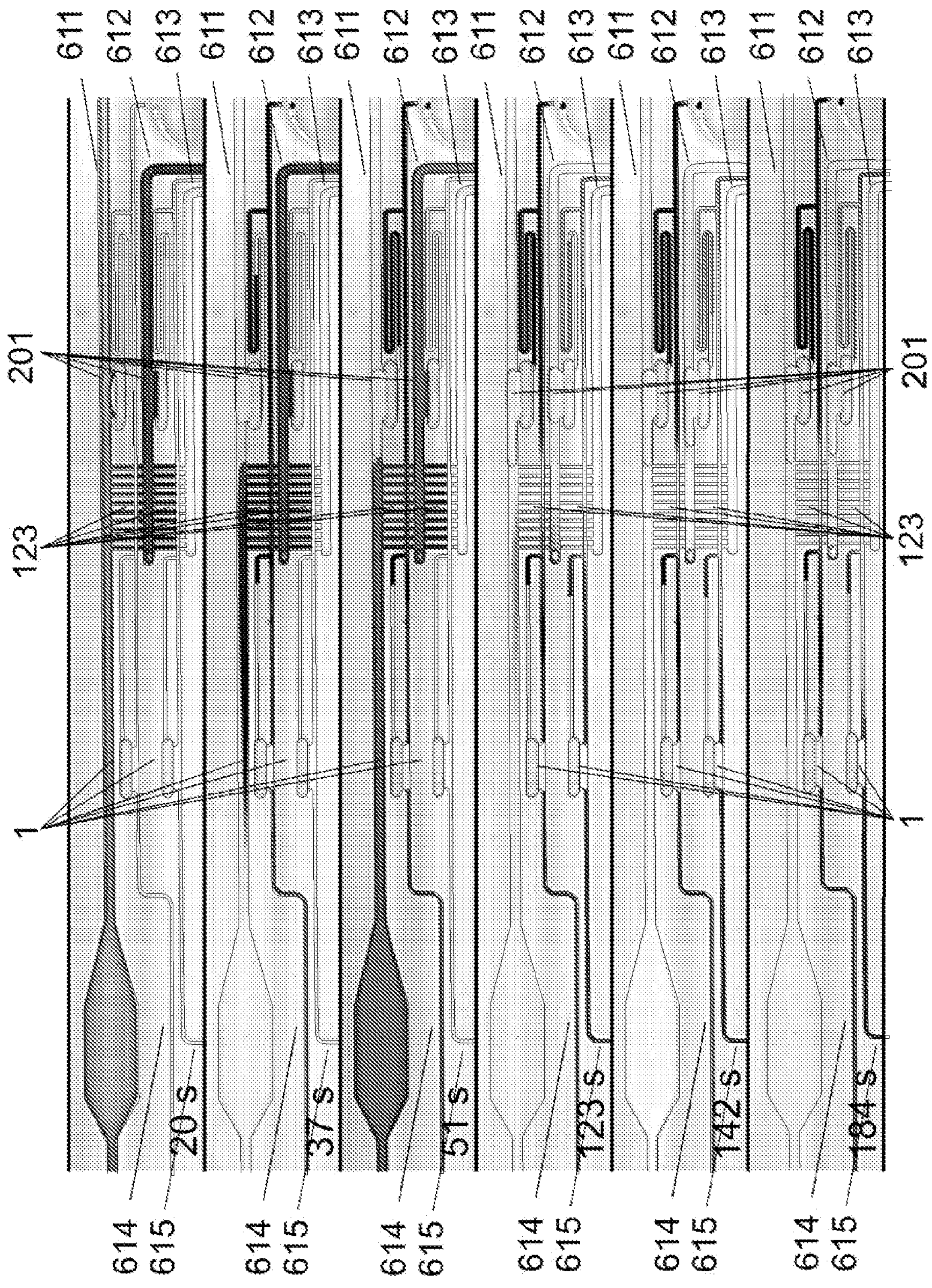
FIG. 13C shows a time lapse of the test circuit of FIG. 13A in operation.

The liquid in the first channel 611 passes into a second valve channel 615 before the microfluidic sealing valve 201 inhibits any further flow through the first channel 611. Flow through the second valve channel 615 triggers another transistor valve 123, permitting fluid communication between the now mixed liquid in the second channel 612 and the liquid in the third channel 613. The arrangement of microfluidic sealing valves 1 and 201 are repeated for the secondary channel 612. As shown in FIG. 13C, this arrangement allows for sequential switching mixing of liquids in successive channels without backflow through the previous channel thanks to the strategic placement of the microfluidic sealing valves 1, 201 relative to the transistor valves 123.

This setup represents a potential arrangement to switch between different channels in a highly controlled way. Additionally, it does so independently from other circuitry, as only the primary channel 611 needs to be filled to trigger the remaining autonomous operation of the test setup. As this can occur from any point within the circuit, this test setup is unaffected by flow rates or dimensions in any of the other channels. This setup could be used to deliver analyte and antibody solutions to a reaction pad with precise incubation timing to conduct immunosorbent assays, which is an advance on previously reported devices. As such a device implementing this test setup would only require the input of an analyte and water, making such a device ideal for 'point-of-care' (POC) diagnostics.

A further use of the microfluidic sealing valves 1, 201 was shown experimentally. With reference to FIGS. 14A-14C and 15A-15B, a lower reservoir 751 is shown fluidly connected via lower reservoir channel 753 to a plurality of microfluidic sealing valves 755. The plurality of microfluidic sealing valves 755 are shown having valve channels 704 with decreasing lengths the further along the lower reservoir channel 753 the corresponding primary channel 702 is positioned. The depths and heights of the valve channels 704 was kept constant.

Each of these primary channels 2 extend to an upper reservoir channel 757 that is connected to an upper reservoir 759. Both the lower reservoir channel 753 and the upper reservoir channel 757 were fabricated to be large such that the hydrostatic pressure drop along them could be neglected.

A first-coloured dye (represented in FIGS. 14A-14C by a darker tone) is added to the lower reservoir 751, the first-coloured dye fills the lower reservoir channel 753, and each of the valve channels 704 and primary channels 702 of the plurality of microfluidic sealing valves 755. This consequently activates the sealing function of the microfluidic sealing valves 755. The first-coloured dye was prevented from flowing into the upper reservoir channel 757 via a stop valve structure that terminates each primary channel 702 at the upper ends thereof.

Figure 14A:
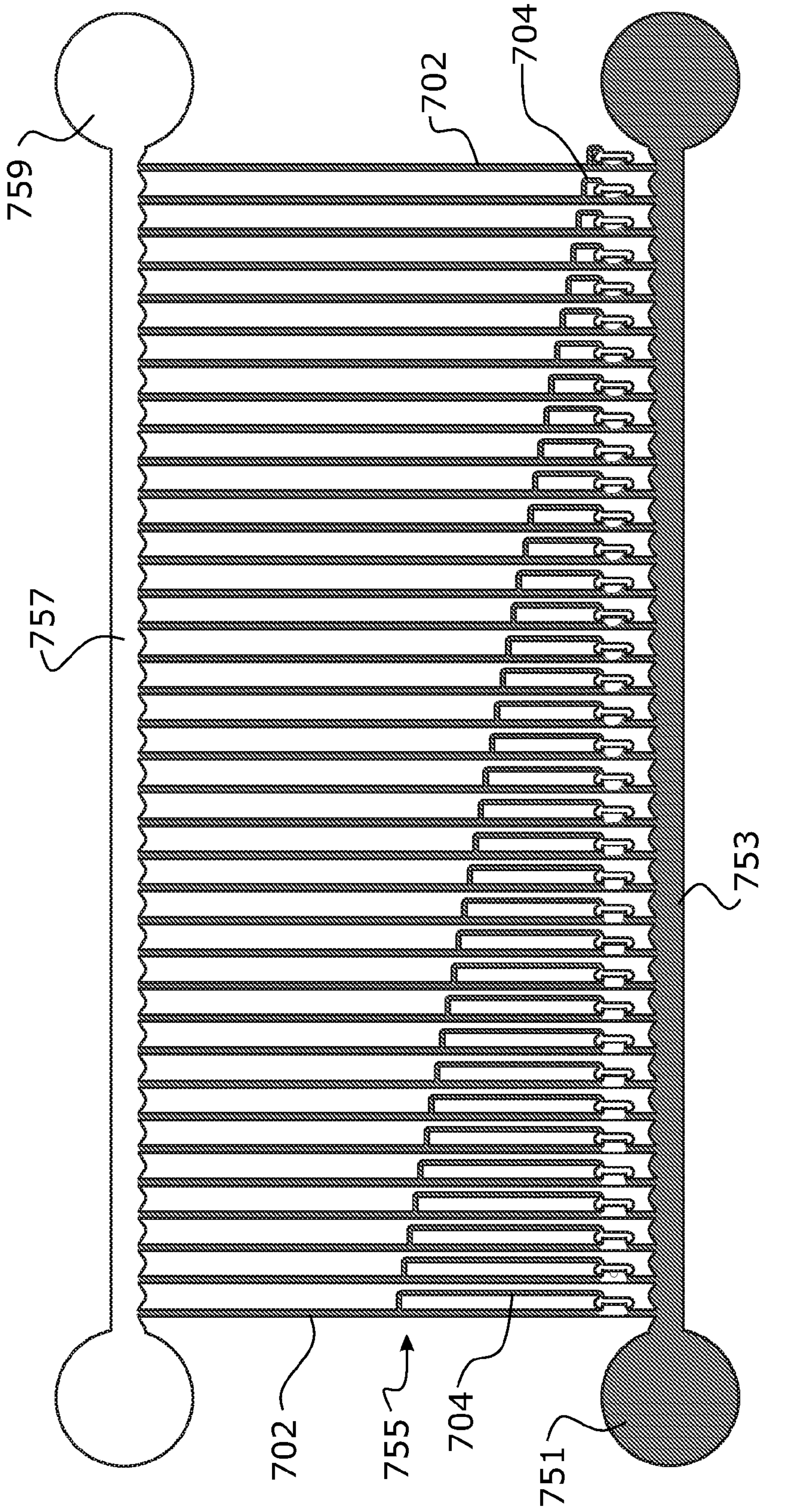
FIG. 14A shows a circuit with multiple microfluidic sealing valves with different length valve channels.

As can be observed in FIG. 14A, for the sealing valves 755 with shorter valve channels 704, the volume of air displaced by the meniscus 709 is insufficient to fully seal the respective primary channel 702. As such, some flow is permitted past the respective first port 708 of these shorter valve channel microfluidic sealing valves.

Figure 14B:
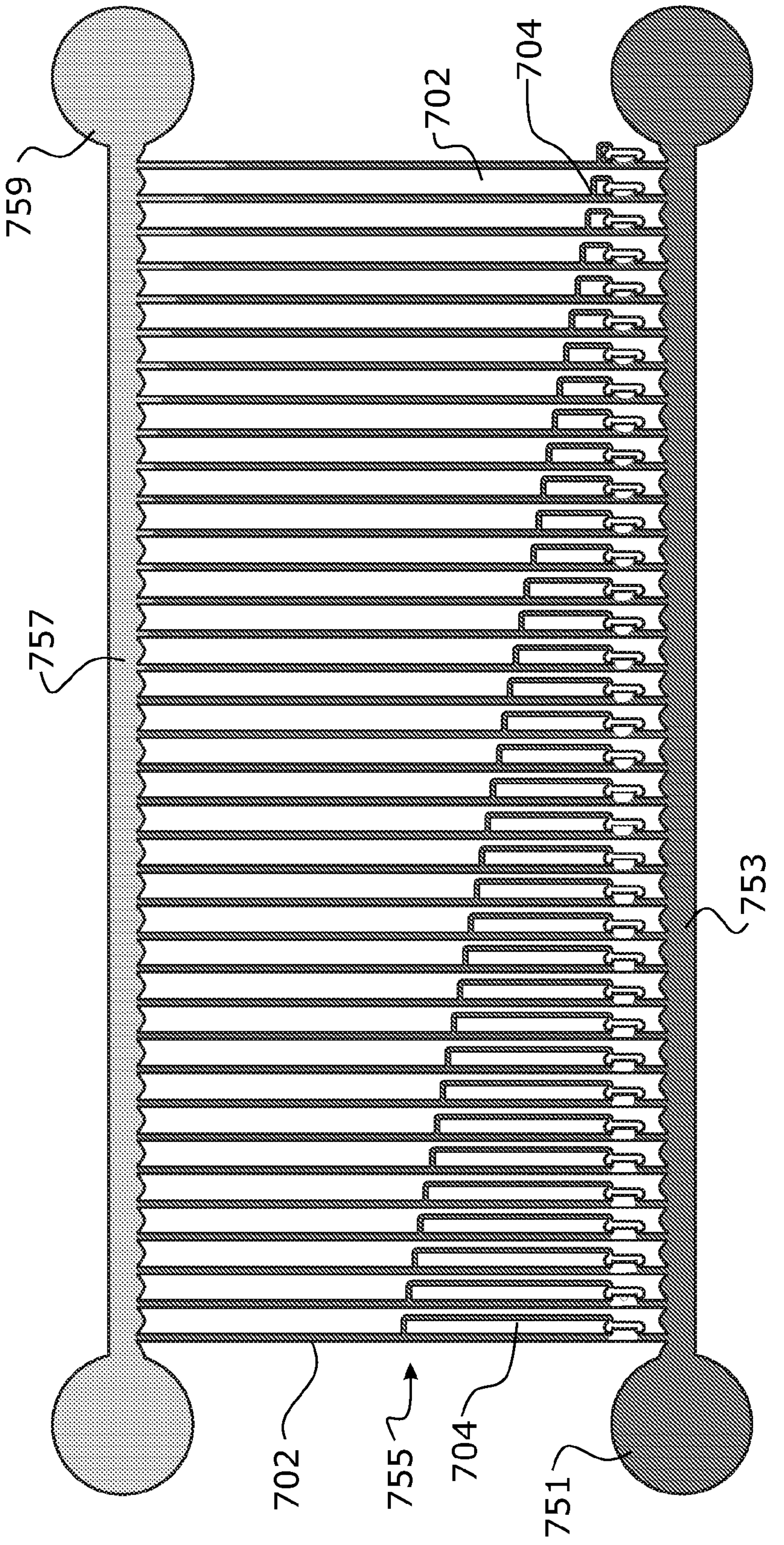
FIG. 14B shows the circuit of FIG. 14A in operation.
Figure 14C:
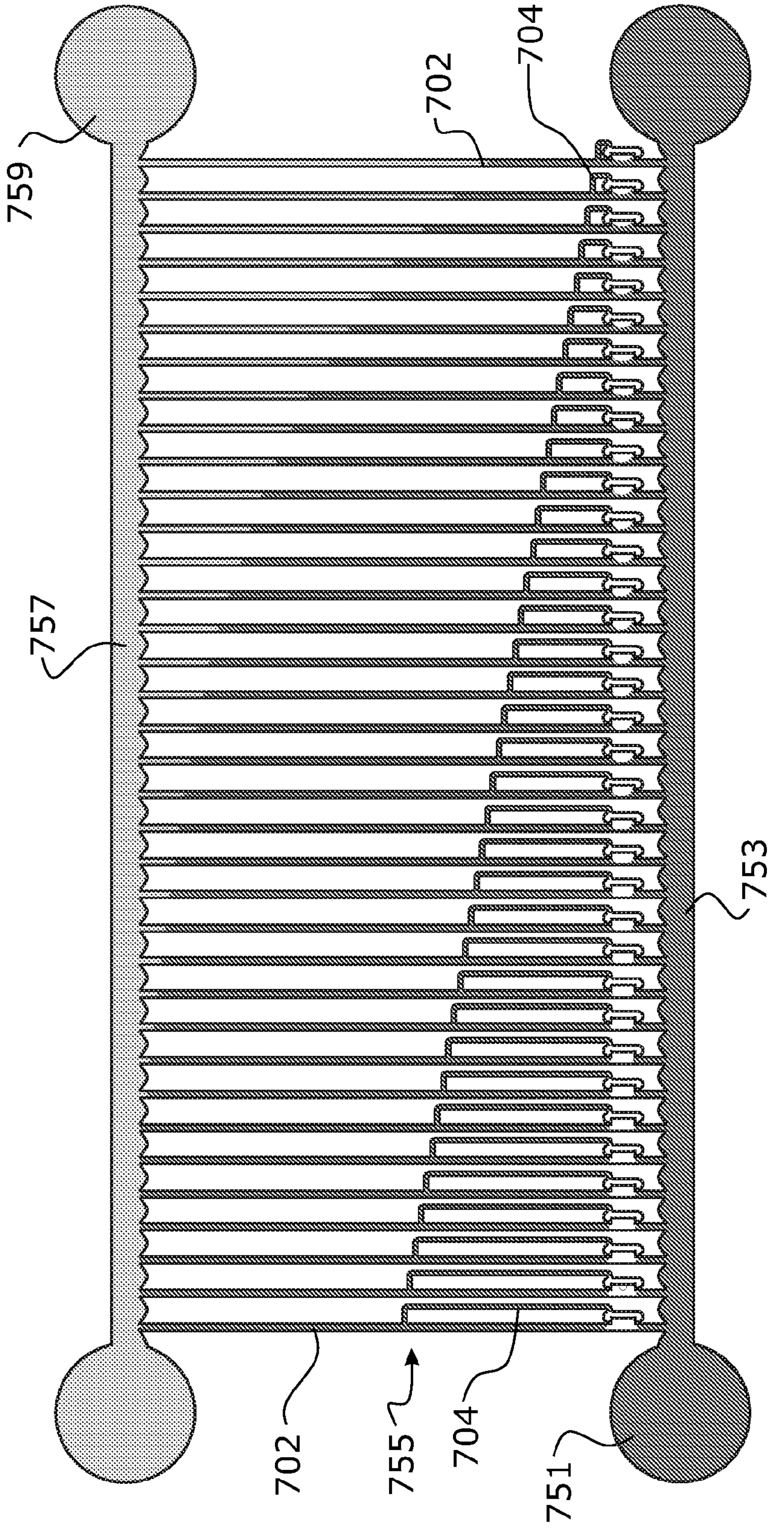
FIG. 14C shows the circuit of FIG. 14A in operation.

This is illustrated more clearly in FIGS. 14B-14C, wherein a second-coloured dye (represented in FIGS. 14B-14C by a lighter tone) is added into the upper reservoir 759 and passes along the upper reservoir channel 757. The second-coloured dye flows a further distance downwardly along the primary channels 702 of the shorter valve channel microfluidic sealing valves compared to those microfluidic sealing valves with longer valve channels.

This is explained by the shorter valve channel microfluidic sealing valves permitting some flow past the respective first ports 708, whereas the longer valve channel microfluidic sealing valves completely inhibit flow therethrough, thereby resulting in an increased flow resistance therethrough.

The change in colour, or the colour gradient, represents the total fluid displacement through each primary channel, and thus the relative hydraulic resistance of each of the plurality of microfluidic sealing valves 755. The change in colour through each primary channel 702 over time was tracked and used to visualise the induced fluid flow rate as a result of the varying flow resistance therethrough.

Figure 15A:
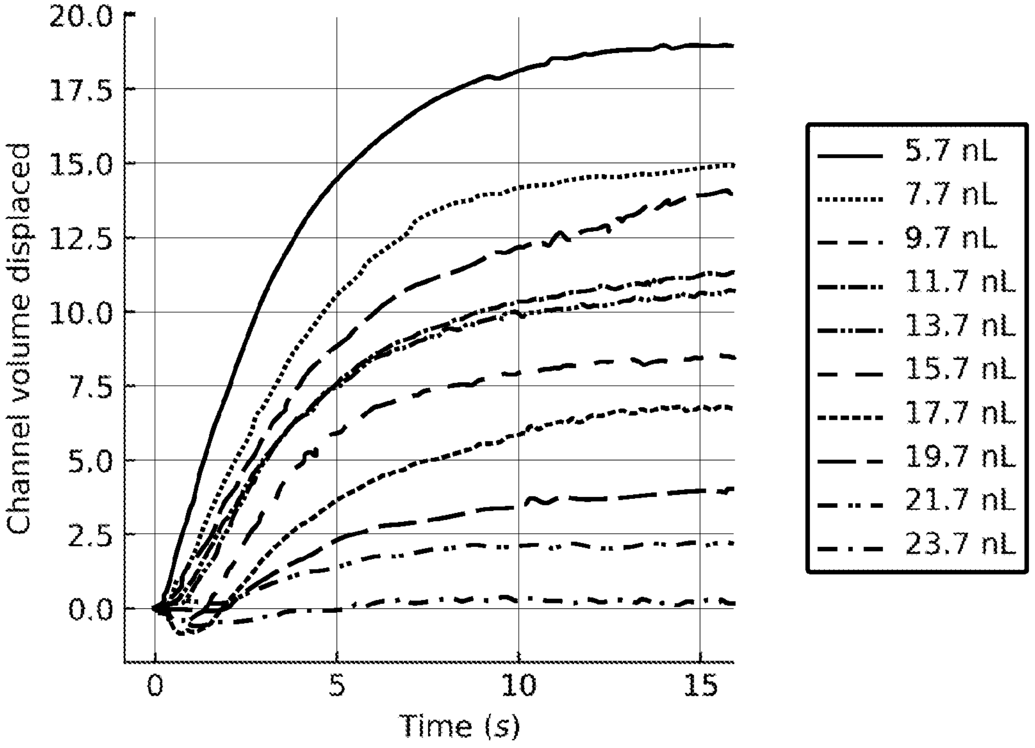
FIG. 15A shows the relationship between the volume of dye displaced in each primary channel of the circuit of FIG. 14A and time.

From this, a time series of the experiment was extracted, where the amount of the second-coloured dye in each of the primary channels 702 was tracked in lieu of a true volumetric flow rate measurement. FIG. 15A shows a plot of this, where the relationship between the volume of dye displaced in each primary channel 702 and time is shown. FIG. 15A shows that each of the primary channels 702 fill with the second-coloured dye to a different extent and at different rates. The initial slopes of each of these curves is linear because no back pressure is present initially. A linear line can be fitted to these initial curves and used as a representative flow rate. The representative flow rates, as a function of the volume of the valve channels 704 of each of the plurality of microfluidic sealing valve 755 are shown plotted in FIG. 15B.

Figure 15B:
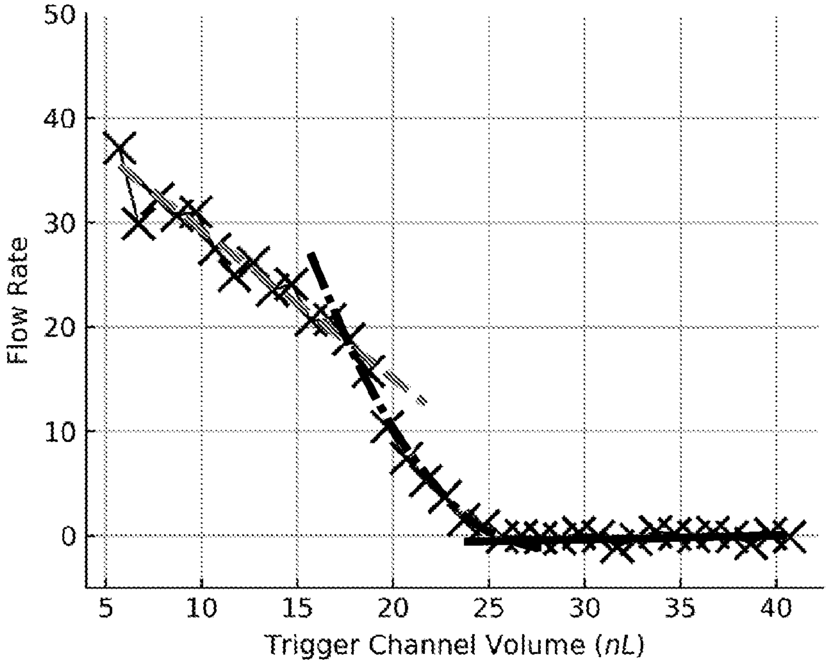
FIG. 15B shows the relationship between the representative flow rates and the volume of the valve channels of the circuit of FIG. 14A.

FIG. 15B shows that the hydraulic resistance, or flow resistance, of each of the plurality of microfluidic sealing valve 755 can be controlled, set or determined by the volume of the respective valve channels 704. As noted above, in these experiments of FIGS. 14A-14C, the volume of the respective valve channels 704 was altered by adjusting the length thereof. FIG. 15B also shows that each of the plurality of microfluidic sealing valves 755 experiences three modes of operation during the experiment.

The first is an initial linear mode, represented by the left-most dashed line, in which the microfluidic sealing valves 755 with the lowest volume valve channels 704, or shortest length valve channels 704, have a linear decrease in flow rate, or linear increase in flow resistance, as the lengths of the valve channels 704 thereof increase.

The second is a hyperbolic mode, represented by the middle-dashed line, in which the flow rate of the microfluidic sealing valves 755 with the medium volume valve channels 704, or medium length valve channels 704, undergoes a steep decrease.

Finally, there is a third full-sealed mode, represented by the right-most dashed line, in which the flow rate through the highest volume valve channels 704, or longest length valve channels 704, drops to zero as the gaseous bubble extends completely to the wall of the primary channel 702 opposite the first port 708.

As described above, the extent to which the gaseous bubble, or meniscus, extends or expands into the primary channel determines the extent to which flow is inhibited therethrough. In some embodiments, the length of the at least one valve channel partly determines the volume of gas therein displaced by the capillary force generated by the flow of liquid therethrough, and thus may determine the extent to which the gaseous bubble, or meniscus, extends or expands into the primary channel. As such, a length of the at least one valve channel determines the extent to which the meniscus restrained at the first port expands from the first port into the primary channel upon generation of the capillary force by the flow of liquid through the at least one valve channel.

Therefore, FIGS. 14A-14C and 15A-15B illustrate the various configurations of the microfluidic sealing valve with different length valve channels that thereby completely inhibit flow through the primary channel, or only partially restrict or inhibit flow therethrough.

Therefore, this experiment demonstrates that the length of the valve channel 4 of a given microfluidic sealing valve 1, 201 can be configured so that the microfluidic sealing valves 1, 201 are tuned to provide various flow resistances through their respective primary channels 702. Therefore, the microfluidic sealing valves 1, 201 may provide flow resistance tuning that can be pre-set or pre-configured by a designer of a microfluidic circuit, in addition to their primarily binary on-off sealing function.

Dimensions tested for these applications are 100-250 μm wide channels (both primary and valve channels). Depths of channels depend on their function, but are selected to provide a higher capillary pressure than the first port. Accordingly, primary channels tested were 100-200 μm deep and valve channels were 30-75 μm deep. Smaller dimensions are expected to work more reliably as gravity influences are reduced.

Embodiments have been described by way of example only and modifications may be made thereto without departing from the scope of the invention.

While the embodiments have been described herein with relation to a flow of liquid through the various components, the term 'liquid' is to be interpreted as referring to either a completely liquid material, or a mixture of a liquid material and gaseous material.

Further, the term 'flow of liquid' does not limit the functionality of the various embodiments described herein to liquids in motion, but may also apply equally to stationary or 'resting' volumes of liquid.

Further, the configuration and arrangement of the microfluidic circuits 20, 120 described herein with reference to FIGS. 5A-5C, 6A-6C, 10, 11A-11C and 12A-12C are exemplary only and could have different configurations and arrangements and/or have features described in relation to particular embodiments combined to form further embodiments without departing from the scope of the invention.

Features described in relation to different embodiments can be combined to form further embodiments without departing from the scope of the invention.

The invention claimed is:

1. A microfluidic sealing valve operable in a non-triggered state in which liquid flow through a primary channel is permitted and a triggered state in which liquid flow through the primary channel is inhibited, comprising:

a primary channel and optionally a secondary channel;

at least one valve channel having an inlet and an outlet;

the at least one valve channel in fluid communication with the primary channel or the secondary channel;

the inlet of the at least one valve channel providing a connection between the at least one valve channel and the primary channel or the secondary channel, the connection between the inlet of the at least one valve channel and the primary channel or the secondary channel having a geometry that permits liquid in the primary channel or the secondary channel to flow into the at least one valve channel through the inlet;

a void volume having a first port connecting the void volume to the primary channel, the first port having a geometry that inhibits liquid in the primary channel from flowing through the first port into the void volume in both the non-triggered state and the triggered state of the microfluidic sealing valve, such that a meniscus moved by a flow of liquid in the primary channel is restrained at the first port, the outlet of the at least one valve channel providing a connection between the at least one valve channel and the void volume, and wherein, the microfluidic sealing valve is configured such that a capillary force is generated to cause a flow of liquid through the primary channel or the secondary channel to flow through the inlet into the at least one valve channel, a cross-sectional area of the first port being substantially larger than a cross-sectional area of the at least one valve channel such that a capillary force generated by the flow of liquid through the at least one valve channel triggers the microfluidic sealing valve and causes the meniscus restrained at the first port to expand from the first port into the primary channel, to inhibit flow of liquid in the primary channel past the first port in the triggered state.

2. The microfluidic sealing valve according to claim 1, wherein the geometry of the outlet of the at least one valve channel is configured to inhibit the liquid in the at least one valve channel from flowing into the void volume.

3. The microfluidic sealing valve according to claim 2, wherein a cross-sectional area of the outlet of the at least one valve channel is equal to the cross-sectional area of the at least one valve channel.

4. The microfluidic sealing valve according to claim 3, further comprising an inner peripheral wall of the void volume, wherein the inner peripheral wall of the void volume located at or adjacent the first port is angled at about 180 degrees or more relative to an imaginary plane extending across the first port and/or the inner peripheral wall of the void volume located at or adjacent the outlet of the at least one valve channel is angled at about 180 degrees or more relative to an imaginary plane extending across the outlet.

5. The microfluidic sealing valve according to claim 1, comprising two or more of the valve channels.

6. The microfluidic sealing valve according to claim 5 wherein the outlets of the two or more valve channels provide a connection between the two or more valve channels and the void volume and the meniscus restrained at the first port expands from the first port into the primary channel to inhibit flow of liquid in the primary channel past the first port only upon generation of a sufficient capillary force caused when a flow of liquid is incoming in both or all of the two or more valve channels, or when a flow of liquid is incoming in one of the two or more valve channels while the other of the two or more valve channels already has liquid present therein.

7. The microfluidic sealing valve according to claim 1, further comprising an intersection of multiple channels is located at the primary channel adjacent the void volume, and wherein the expansion of the meniscus restrained at the first port into the primary channel inhibits flow of liquid in the primary channel and in the intersection of multiple channels, past the first port.

8. The microfluidic sealing valve according to claim 1, wherein the inlet of the at least one valve channel provides the connection between the at least one valve channel and the primary channel and is in fluid communication with the primary channel.

9. The microfluidic sealing valve according to claim 1, wherein the valve comprises the primary channel and the secondary channel, and wherein the inlet of the at least one valve channel provides the connection between the at least one valve channel and the secondary channel and is in fluid communication with the secondary channel.

10. A microfluidic circuit comprising:

a main channel;

a trigger channel;

a transistor valve, the transistor valve comprising:

a first plurality of microchannels extending between and fluidly connecting the trigger channel to the main channel;

wherein a geometry of the first plurality of microchannels between the trigger channel and the main channel is configured such that liquid in the main channel is inhibited from flowing into the trigger channel through the first plurality of microchannels unless liquid is present in the trigger channel at or adjacent the first plurality of microchannels, and such that when liquid is present in the trigger channel at or adjacent the first plurality of microchannels, fluid communication is permitted between the liquid in the main channel and the liquid in the trigger channel through the first plurality of microchannels to permit the liquids to mix; and the microfluidic circuit further comprising the microfluidic sealing valve according to claim 1 provided at the trigger channel.

11. The microfluidic circuit according to claim 10, wherein a depth of each of the first plurality of microchannels is shallower than a depth of the main channel.

12. The microfluidic circuit according to claim 10, wherein a geometry of the first plurality of microchannels between the trigger channel and the main channel is configured such that liquid in the trigger channel is inhibited from flowing into the main channel through the first plurality of microchannels unless liquid is present in the main channel at or adjacent the first plurality of microchannels.

13. The microfluidic circuit of claim 12, wherein the transistor valve further comprises a second plurality of microchannels extending between and fluidly connecting the trigger channel to a supply channel, wherein a geometry of the second plurality of microchannels between the trigger channel and the supply channel is configured such that liquid in the supply channel is inhibited from flowing into the trigger channel through the second plurality of microchannels unless liquid is present in the trigger channel at or adjacent the second plurality of microchannels, and such that liquid in the trigger channel is inhibited from flowing into the supply channel through the second plurality of microchannels unless liquid is present in the supply channel at or adjacent the second plurality of microchannels, and such that when liquid is present in the trigger channel at or adjacent the first plurality of microchannels and the second plurality of microchannels, fluid communication is permitted between the liquid in the main channel, the liquid in the trigger channel and the liquid in the supply channel through the first and second plurality of microchannels to permit the liquids to mix.

14. The microfluidic circuit according to claim 13, wherein the first plurality of microchannels and/or the second plurality of microchannels each have a depth that is shallower than a depth of the trigger channel, the main channel, and/or the supply channel.

15. The microfluidic circuit according to any one of claim 13, wherein an imaginary plane extending across the second plurality of microchannels is angled at about 180 degrees or more relative to an inner peripheral wall of the trigger channel located at or adjacent to the second plurality of microchannels.

16. The microfluidic circuit according to claim 10, wherein an imaginary plane extending across the first plurality of microchannels is angled at about 180 degrees or more relative to an inner peripheral wall of the trigger channel located at or adjacent to the first plurality of microchannels.

17. The microfluidic circuit according to claim 10, wherein the primary channel of the microfluidic sealing valve forms part of and is in fluid communication with the trigger channel of the microfluidic circuit, such that expansion of the meniscus at the first port into the primary channel inhibits flow of liquid in the trigger channel past the first port.

18. The microfluidic circuit according to claim 17, wherein the inlet of the at least one valve channel is provided at the trigger channel proximate to the microfluidic sealing valve, and wherein the microfluidic circuit is arranged such that flow of liquid through the trigger channel will pass through the microfluidic sealing valve provided at the trigger channel, the at least one valve channel of the microfluidic sealing valve arranged to allow the flow of liquid through the trigger channel to progress to the transistor valve before the microfluidic sealing valve inhibits the flow of liquid through the trigger channel.

19. The microfluidic circuit according to claim 10, wherein the microfluidic sealing valve is provided with a layer of hydrophobic material, and/or the microfluidic circuit is provided with a layer of hydrophobic material.

* * * * *